United States Patent
Hahn

(10) Patent No.: US 8,544,726 B1
(45) Date of Patent: Oct. 1, 2013

(54) METHOD AND SYSTEM FOR PROVIDING AN AUTOMATED AND INTEGRATED R AND D TAX CREDIT TOOL

(75) Inventor: Sandra Hahn, Dublin, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/363,257

(22) Filed: Jan. 31, 2012

(51) Int. Cl.
*G06F 7/00* (2006.01)

(52) U.S. Cl.
USPC ............................................. 235/376; 705/31

(58) Field of Classification Search
USPC .................. 705/1.1, 2, 28, 30, 31, 32, 35, 38, 705/400; 707/999.104, 999.107; 235/376, 235/377
See application file for complete search history.

(56) References Cited

U.S. PATENT DOCUMENTS

| | | | | |
|---|---|---|---|---|
| 6,067,522 | A * | 5/2000 | Warady et al. | 705/2 |
| 7,539,635 | B1 * | 5/2009 | Peak et al. | 705/31 |
| 8,214,230 | B1 * | 7/2012 | DiPiero et al. | 705/2 |
| 8,340,979 | B2 * | 12/2012 | Zou et al. | 705/1.1 |
| 2011/0082778 | A1 * | 4/2011 | Dombroski et al. | 705/32 |

* cited by examiner

*Primary Examiner* — Andrew Joseph Rudy
(74) *Attorney, Agent, or Firm* — McKay and Hodgson, LLP; Philip McKay

(57) ABSTRACT

In accordance with one embodiment, one or more R&D project/activity survey tools are generated and used to obtain employee R&D activity data. Payroll data is automatically obtained and the employee R&D activity data and employee payroll data is used to determine a R&D cost data indicating a total cost to a business of all employee time devoted to qualified R&D. R&D tax credit qualification data for the business is also automatically obtained and the R&D cost data and R&D tax credit qualification data for the business is used to automatically calculate the R&D tax credit for the business. Any evidentiary data supporting the calculated R&D tax credit data is then automatically correlated and stored.

36 Claims, 2 Drawing Sheets

METHOD AND SYSTEM FOR PROVIDING AN AUTOMATED AND INTEGRATED R AND D TAX CREDIT TOOL

BACKGROUND OF THE INVENTION

In an effort to encourage investment in the United States in new technologies and potential new product lines/revenue sources; and to ensure the United States stays competitive technologically with other countries, both the federal government and some state governments subsidize certain types of research and development costs ("qualified R&D expenditures") incurred by United States businesses (businesses are companies or individuals). Businesses can obtain the government subsidies by claiming research and development tax credits ("R&D tax credits"), which reduces their tax liability on their tax returns. The federal R&D tax credit is set forth in Internal Revenue Code Section 41. R&D tax credits can be quite lucrative. The federal R&D tax credit alone is generally equal to 10% of "qualified R&D expenditures." However, in order to obtain R&D tax credits, businesses must spend an inordinate amount of time and resources complying with the United States and various other state tax laws to determine: 1) what types of R&D projects and activities qualify for the R&D tax credit; and 2) how to accurately quantify the R&D tax credit. In order to achieve the two aforementioned tasks, businesses must collect, analyze, and retain a significant amount of supporting data and documentation. Besides having to collect, analyze and retain data in order to determine the exact amount of the R&D tax credit, the business must retain the collected/processed data/documentation as supporting evidentiary documentation for government tax audit purposes. Furthermore, the data must often be retained for several years, as government audits often take place several years after the year in which the R&D tax credit is claimed.

For instance, in order to determine what types of projects and activities qualify for the R&D tax credit, businesses must gather supporting documentation evidencing that the projects and activities meet the R&D qualification rules (set forth in Internal Revenue Code Section 41). After the qualifying projects and activities have been determined, the amount of time spent by each of the business' employees and contractors performing qualified R&D activities must be quantified. To quantify the qualifying R&D costs, each employee's and each contractor's percentage of time spent performing qualified R&D activities is applied to his/her compensation. Therefore, employee's compensation data, contractor's cost data, and supplies cost data must be obtained in order to quantify the R&D tax credit.

The Internal Revenue Service (IRS), as well as certain state tax agencies, requires detailed supporting evidence to support R&D tax credit claims. In addition, it is preferable that the evidence/documentation be contemporaneous primary source documentation, i.e., the documentation/data should be obtained directly from/submitted by the actual employees performing the R&D work contemporaneously. Therefore, to avoid challenge or denial of claimed R&D tax credits, businesses should create a process whereby each individual employee and contractor who performs qualified R&D activities complete/submit their own time reports indicating the percentage of time dedicated to R&D projects/activities.

However, requiring employees to complete/submit time reports can be challenging. Employees often do not want to take time out of their busy schedule to complete and submit the necessary contemporaneous information about how they spent their time during the year. The employee's reluctance to submit R&D information can result in a low response rate, and therefore weak and/or non-defendable tax credit claims. Furthermore, time and energy must be devoted to train the employees about R&D projects/activities, and to manage the R&D tax credit process in order to maximize the R&D tax credit and to ensure that the required R&D documentation is acceptable and properly retained.

In addition, as mentioned previously, evidence related to the qualification of R&D projects/activities, and time spent by the employee performing qualified R&D activities, should be in the form of primary source documents. That is, each employee engaged in R&D activities should submit contemporaneous documentation about the type of activity they performed, as well as the amount of time spent on qualified R&D projects and activities. A summary report completed by the employee's manager, or other higher level aggregated data source is unacceptable R&D tax credit documentation.

Failure to obtain, submit, accurately determine, and store the necessary supporting R&D tax credit documentation can result in lost R&D tax credits as well as penalties and interest assessments. Consequently, to claim the R&D tax credit with a high degree of confidence requires a significant amount of time and resources dedicated to properly documenting R&D project/activities, correctly calculating the R&D tax credit, and ensuring that the proper evidentiary documentation/data is maintained to support and defend the R&D tax credit claimed. These requirements can be a significant burden on businesses, but are particularly problematic for small businesses that often do not have the available resources to properly document the qualification of R&D projects/activities, correctly calculate the R&D tax credit, and ensure that the proper documentation is retained for audit purposes, merger and acquisition purposes, and/or for various other purposes desired and/or required.

As a result of the situation described above, many small businesses that would legitimately qualify for R&D tax credits fail to apply for the R&D tax credits because they do not completely understand the tax laws, and/or the process is viewed as far too burdensome, and/or the risks of incorrectly claiming an R&D tax credit are viewed as too high. For the same reasons, accounting professionals, such as Certified Public Accountants (CPAs), also often fail to take full advantage of legitimately available R&D tax credits, and/or to properly inform their small business clients of the available R&D tax credits and how to safely claim them.

In addition, even in cases where a small business legitimately qualifies for R&D tax credits, and appropriately claims the R&D tax credits on its tax returns, the small business often has no standardized, efficient, or even consistent method, process, or system in place for documenting the necessary supporting evidence of the claimed R&D tax credit, or calculating the R&D tax credit. As a result, significant inefficiencies are introduced which could result in: 1) the failure to maximize the amount of the potential R&D tax credit; 2) a risk of the denial of the R&D tax credit due to the lack of the necessary supporting documentation (incomplete and/or unacceptable documentation) to defend the claimed R&D tax credit; and/or 3) the incorrect calculation of the R&D tax credit claimed. If the government denies all or a portion of the R&D tax credit, penalties and interest could also be assessed.

The current situation serves to largely negate the positive effects and intended results of R&D tax credits, i.e., to encourage United States companies to engage in research and development to ensure that the United States remains competitive in the global marketplace; and to give United States businesses more capital to invest in R&D. Currently, many small businesses either forgo R&D tax credits they legitimately qualify for, thereby forgoing capital that could be invested in further research, or they waste resources on inefficient, and often ad-hoc, R&D tax credit documentation processes.

What is needed is an effective method and system whereby accounting professionals can offer their small business clients an efficient, consistent, and resource conserving process to identify, document, and calculate R&D tax credits; as well as an effective process to retain the supporting evidentiary data and documentation for use in the event of an audit, merger and acquisition, and/or for various other purposes desired and/or required.

SUMMARY OF THE INVENTION

In accordance with one embodiment, a method and system for providing an automatic and integrated R&D tax credit program includes a process for providing an automatic and integrated R&D tax credit program whereby one or more standardized R&D project/activity survey tools are created that both identify and classify qualified R&D tax credit projects and activities. In one embodiment, the R&D project/activity survey tools are made available to an accounting professional, and/or a client of the accounting professional. In one embodiment, the R&D project/activity survey tools are provided to employees of a client business of the accounting professional. In one embodiment, employee R&D activity data is collected from the employees through the R&D project/activity survey tools.

In one embodiment, access to one or more data management systems used by, or associated with, the client business, and/or the accounting professional, is provided to the process for providing an automatic and integrated R&D tax credit program. In various embodiments, the one or more data management systems include, but are not limited to, one or more of: a computing system implemented, and/or web-based, business financial management system used by the client of the accounting professional, and/or used by the accounting professional on behalf of the client; a computing system implemented, and/or web-based, payroll management system used by the client of the accounting professional, and/or used by the accounting professional on behalf of the client; and/or a computing system implemented, and/or web-based, tax preparation system used by the client of the accounting professional, and/or used by the accounting professional on behalf of the client.

In one embodiment, the process for providing an automatic and integrated R&D tax credit program is provided access to the collected employee R&D activity data.

In one embodiment, payroll data for each employee is automatically obtained from the one or more data management systems accessible by the process for providing an automatic and integrated R&D tax credit program, such as a computing system implemented, and/or web-based, payroll management system used by the client business. In one embodiment, each employee's and each contractor's percentage of time spent performing qualified R&D activity is linked automatically to each employee's payroll data, and each contractor's cost data, thus enabling the program to automatically calculate the R&D qualifying costs and the R&D tax credit.

In one embodiment, R&D tax credit qualification data is automatically obtained from the one or more data management systems accessible by the process for providing an automatic and integrated R&D tax credit program.

In one embodiment, the R&D tax credit qualification data includes R&D tax credit qualification rules/requirements data automatically obtained from the one or more data management systems accessible by the process for providing an automatic and integrated R&D tax credit program, such as a computing system implemented, and/or web-based, tax preparation system used by the client business.

In one embodiment, the R&D tax credit qualification data also includes R&D tax credit related operational/financial data for the client business automatically obtained from the one or more data management systems accessible by the process for providing an automatic and integrated R&D tax credit program, such as a computing system implemented, and/or web-based, business financial management system used by the client business. In one embodiment, using the R&D tax credit qualification data, each contractor's percentage of time spent performing qualified R&D activity is automatically linked to each contractor's cost information, thus enabling the process for providing an automatic and integrated R&D tax credit program to automatically calculate the R&D qualifying costs and the R&D tax credit.

In one embodiment, the qualified R&D cost data for the client business, and/or at least part of the R&D tax credit qualification data for the client business, is transformed into R&D tax credit data for the client business.

In one embodiment, the R&D tax credit data for the client business is automatically transferred to one or more data management systems accessible by the process for providing an automatic and integrated R&D tax credit program, such as a computing system implemented, and/or web-based, tax preparation system used by the client business. In one embodiment, the R&D tax credit data for the client business is then automatically used to auto-fill one or more tax forms to be submitted by, or on behalf of, the client business.

In one embodiment, all, or part of: the collected employee and contractor R&D activity data for each employee and contractor; the qualified R&D cost data for the client business; the R&D tax credit qualification data for the client business; the calculated R&D tax credit data; data indicating the methods used to calculate the R&D tax credit for the client business; and/or any other evidentiary data supporting the calculated, and/or claimed, R&D tax credit, is automatically correlated and securely stored, with limited access, as R&D tax credit evidentiary data for use in further analysis and/or in the event of an audit.

Using the process for providing an automatic and integrated R&D tax credit program, as discussed herein, accounting professionals can offer their small business clients an efficient, consistent, and resource conserving, process for identifying, documenting, and calculating, R&D tax credits and securely storing the supporting evidentiary data and documents for use in the event of an audit, merger and acquisition, and/or for various other purposes desired and/or required.

In addition, in one embodiment, the activity questions of the R&D project/activity survey tools are specifically crafted to be easily understandable and meaningful to both the survey taker and the IRS to increase the employee survey response rate as well as IRS acceptance rate. In addition, in one embodiment, the R&D project/activity survey tools are customized based on industry and company.

As a result, using the process for providing an automatic and integrated R&D tax credit program, as discussed herein, accounting professionals can provide their small business clients an efficient and consistent program and process to determine and maximize R&D tax credits they legitimately claim, and a system to apply for the R&D tax credits, without devoting unreasonable resources to the program, and with minimized risk of incorrectly claiming an R&D tax credit. Consequently, the process for providing an automatic and integrated R&D tax credit program, as discussed herein, supports and facilitates the positive goals of R&D tax credits to encourage United States research and development, to ensure the United States remains technologically competitive globally, and to give a business more capital to invest in R&D.

In addition, as discussed in more detail below, using the below embodiments, with little or no modification and/or user input, there is considerable flexibility, adaptability, and opportunity for customization to meet the specific needs of various users under numerous circumstances.

Figure 1:
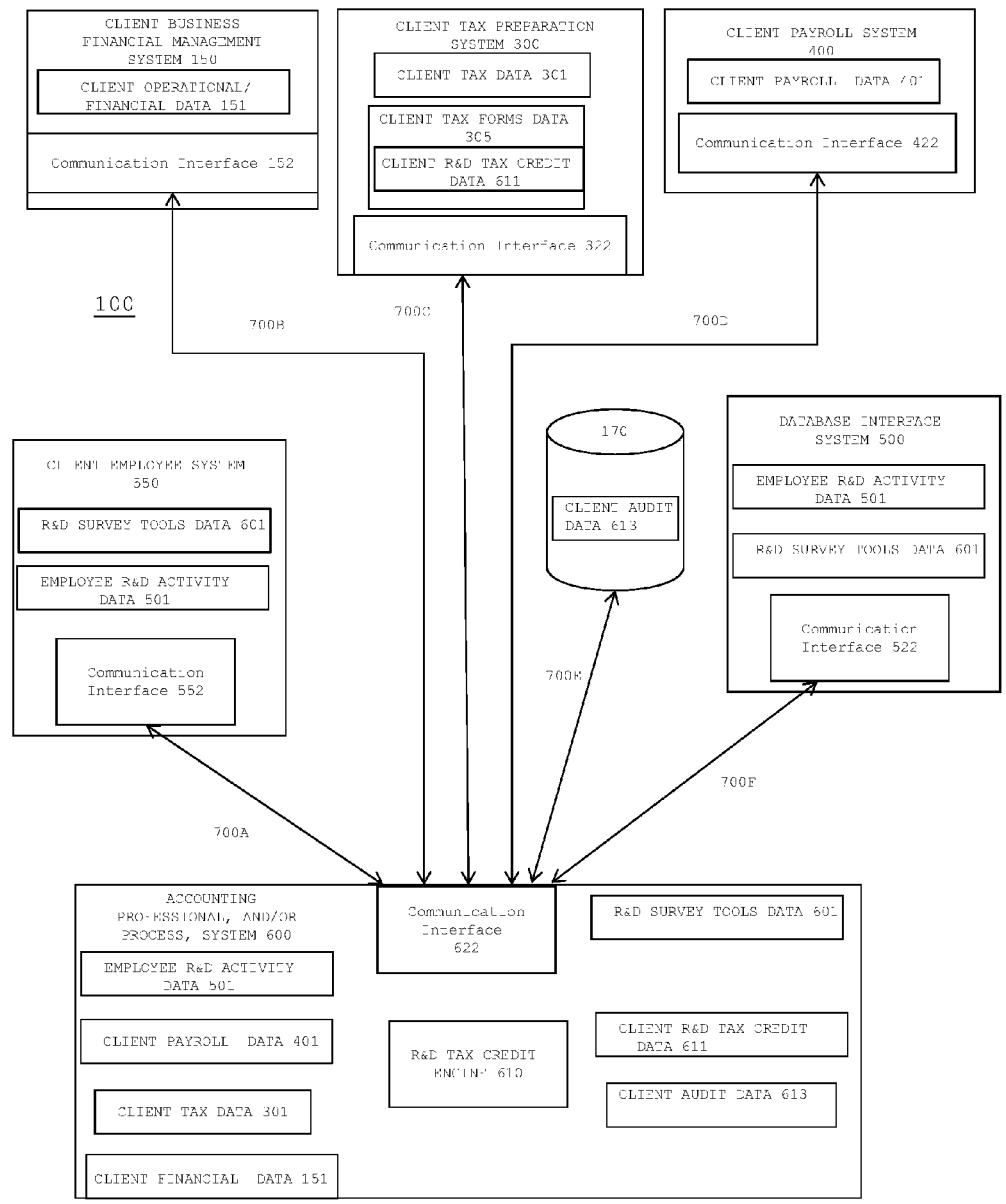
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

As used herein, the term "employee" includes, but is not limited to: salaried workers and/or service providers; hourly workers and/or service providers; full time workers and/or service providers; part time workers and/or service providers; contracted workers and/or service providers, or "contractors"; and/or any other workers and/or service providers who are provided some form of compensation for their time and services.

In accordance with one embodiment, a method and system for providing an automatic and integrated R&D tax credit program includes a process for providing an automatic and integrated R&D tax credit program whereby one or more standardized R&D project/activity survey tools are created and employed that both identify and classify qualified R&D tax credit projects and activities.

In one embodiment, the standardized R&D project/activity survey tools are then made available to an accounting professional, and/or a client of the accounting professional.

In various embodiments, the standardized R&D project/activity survey tools include, but are not limited to, one or more pre-created and standardized employee R&D project/activity survey forms. In one embodiment, the employee R&D project/activity survey forms are standardized forms generated for defined business types, industries, and/or markets. In one embodiment, multiple standardized employee R&D project/activity survey forms are provided to an accounting professional and/or a client business of an accounting professional as choices. In one embodiment, and the accounting professional, and/or a client business of the accounting professional, then select the appropriate pre-created standardized form depending upon the business type, industries, and/or market of client business.

In one embodiment, the standardized employee project/activity survey forms are updated periodically from information collected from ongoing live data of client businesses and/or information collected from other sources. In various embodiments, the standardized R&D project/activity survey tools are editable and can be customized by the accounting professional and/or a client business of the accounting professional. Consequently, in one embodiment, an accounting professional is provided the capability to provide client businesses with standardized employee R&D project/activity survey forms categorized by client business type, industries, and/or markets, and/or as customized by the accounting professional and/or the client business.

In one embodiment, the employee R&D project/activity survey forms include an R&D project/activity coding system and pre-coded survey activities/questions regarding potential R&D activity that are pre-determined as qualified activities for R&D tax credits. In various embodiments, the predefined R&D activity codes are editable and can be modified by the accounting professional and/or one or more client businesses of the accounting professional.

In various embodiments, the employee R&D project/activity survey forms are specifically generated to be accessed, and completed, by employees of the client business. As discussed below, in various embodiments, the employee R&D project/activity survey forms are designed to link employee project/activity information with other information obtained by process for providing an automatic and integrated R&D tax credit program.

In one embodiment, the employee R&D project/activity survey forms include R&D activity questions that are specifically crafted to be easily understandable and meaningful to both the survey taker (e.g., the employees and/or contractors of the client business) and the IRS to increase the employee survey response rate as well as IRS acceptance rate.

In one embodiment, the R&D project/activity survey tools include, but are not limited to, audio, video, or text-based, R&D tax credit tutorials that explain to the employees of the client business the purpose of the employee R&D project/activity survey forms, and/or any other R&D project/activity survey tools. In various embodiments, the R&D tax credit tutorials include instructions regarding what qualifies as R&D project/activity and/or for R&D tax credit and how the R&D tax credit program works.

In various embodiments, the R&D tax credit tutorials include instructions for completing the employee R&D project/activity survey forms and an explanation of the R&D project activity codes and coding system.

Consequently, in various embodiments, the R&D tax credit tutorials provide employees with an understandable explanation of what projects/activities qualify for R&D tax credit and provides the employees with a meaningful, convenient, and intuitive method for providing contemporaneous employee R&D project/activity data that makes the collection, and documentation, of employee R&D project activity data relatively consistent, efficient, easy, and user-friendly.

In various embodiments, any other R&D project/activity survey tools are generated as desired by the provider of process for providing an automatic and integrated R&D tax credit program.

In one embodiment, the R&D project/activity survey tools are provided to employees of a client business of the accounting professional. In one embodiment, the R&D project/activity survey tools are provided to employees of the client business through one or more database interface systems made available to the employees of the client business by the client, and/or the accounting professional.

In various embodiments, the one or more database interface systems through which the R&D project/activity survey tools are provided to employees of a client business include, but are not limited to, one or more database applications implemented to interface with a centralized database that provides for the viewing, and input of, data, forms, documents, and various other multimedia sources and is capable of correlating and storing the data, forms, and documents within one or more organizational systems. In various embodiments, the one or more database interface systems interface with databases implemented via one or more computing systems and accessed via the cloud, or any other network or data source.

A specific example of a database interface system is QuickBase™ available from Intuit Inc. of Mountain View Calif.

In one embodiment, the employee R&D project/activity survey forms are provided to the employees of the client business through a database interface system implemented, and/or maintained by, the provider of the process for providing an automatic and integrated R&D tax credit program. In one embodiment, the employee R&D project/activity survey forms are provided to the employees of the client business through a database interface system implemented, and/or maintained by, the client business. In one embodiment, the employee R&D project/activity survey forms are provided to the employees of the client business through a database interface system implemented, and/or maintained by, and/or associated with, the accounting professional. In one embodiment, the employee R&D project/activity survey forms are provided to the employees of the client business through a database interface system implemented, and/or maintained by, and/or associated with, a third party on behalf of the accounting professional and/or the client business.

In various embodiments, the R&D tax credit tutorials are also provided to the employees of the client business through the database interface system.

In various embodiments, the employees of the client business are provided the opportunity to enter data into the employee R&D project/activity survey forms on an "as needed" basis, e.g., a daily basis, a weekly basis, a monthly basis, a quarterly basis, a yearly basis, etc. In various embodiments, the employees of the client business are provided the opportunity to enter data into the employee R&D project/activity survey forms via any computing system as discussed herein, and/or as known/available in the art at the time of filing, and/or as developed after the time of filing.

Herein, the term "computing system" includes, but is not limited to, any computing system known in the art at the time of filing, and/or as developed after the time of filing, such as, but not limited to: a mobile computing system; a desktop computing system; a laptop computing system; a notebook computing system; a tablet computing system; a workstation; a two-way pager; a cellular telephone; a smart phone; a digital wireless telephone; a Personal Digital Assistant (PDA); a server computing system; an Internet appliance; and/or any other device, or any desired combination of these devices, that includes components that can execute all, or part, the operations and/or processes discussed herein in accordance with at least one of the embodiments as discussed herein, and/or as known in the art at the time of filing, and/or as developed after the time of filing.

In various embodiments, the employees of the client business can upload/attach various R&D qualification/evidentiary data and/or documents via a mobile computing system and/or a mobile application, such as a phone, and the database interface system.

Herein, the term "mobile computing system" includes, but not limited to: a mobile phone; a smart phone; a tablet; a notebook; a laptop; an internet appliance; any Short Message Service (SMS) capable system; or any other mobile computing system as discussed herein, and/or as known in the art at the time of filing, and/or as developed after the time of filing.

In one embodiment, the employees of the client business are provided a chat room to discuss R&D tax credit related issues with other employees of the client business, and/or the accounting professional, or representatives of the accounting professional.

In some embodiments, the employee response rate is monitored and response rate data is provided to the accounting professional, and/or the client of the accounting professional, on a periodic basis and/or on pre-defined dates or at pre-defined time intervals.

In various embodiments, reminder messages are automatically generated and sent to employees of the client business to remind the employees of the client business to complete, and/or submit, the employee R&D project/activity survey forms. In various embodiments, the reminder messages can be, but are not limited to, e-mail reminder messages, SMS reminder messages, phone reminder messages, and/or any form of reminder message as discussed herein, and/or as known in the art at the time of filing, and/or as developed after the time of filing.

In various embodiments, the reminder messages are standardized reminder messages that are sent on a periodic basis such as daily, weekly, monthly, quarterly, etc. In some embodiments, the reminder messages are sent on defined dates corresponding the tax reporting dates and/or project completion dates, and/or any other date desired and/or identified.

In various embodiments, the reminder messages are standardized reminder messages provided by the process for providing an automatic and integrated R&D tax credit program. In various embodiments, the reminder messages are editable and can be modified by the accounting professional and/or the client business.

In various embodiments, the employee R&D activity data is automatically provided to the process for providing an automatic and integrated R&D tax credit program through the employee R&D project/activity survey forms, and/or other R&D project/activity survey tools, and the one or more database interface systems.

In various embodiments, the employee R&D activity data is automatically analyzed, and classified, using the provided coding system. In various embodiments, the accounting professional is alerted to any employee R&D activity data that appears to be in error, incomplete, inaccurate, or extraordinary, based on historical input and analysis regarding the client business itself, and/or data from similarly situated companies, and/or client businesses.

In various embodiments, the employee R&D activity data is automatically analyzed to determine the total time spent by each employee on qualifying R&D projects/activities.

In various embodiments, employee R&D activity data is then stored using any data storage method, means, mechanism, process, and/or procedure, as discussed herein, and/or as known in the art at the time of filing, and/or as developed after the time of filing.

In one embodiment, the one or more database interface systems, and/or the employee R&D activity data, are made accessible to the process for providing an automatic and integrated R&D tax credit program and the employee R&D activity data is automatically provided to process for providing an automatic and integrated R&D tax credit program.

In one embodiment, access to one or more data management systems used by, or associated with, the client of the accounting professional, and/or the accounting professional, is provided to the process for providing an automatic and integrated R&D tax credit program.

Herein, the term "data management system" includes, but is not limited to: any on-line, and/or web-based, and/or computing system implemented, payroll management system, package, program, module, or application; any on-line, and/or web-based, and/or computing system implemented, tax preparation system, package, program, module, or application; any on-line, and/or web-based, and/or computing system implemented, business financial management system, package, program, module, or application; and/or any on-line, and/or web-based, and/or computing system implemented, data processing system as discussed herein, and/or as known/available in the art at the time of filing, and/or as developed/made available after the time of filing.

Herein, a "payroll system" is any an on-line, and/or web-based, and/or computing system implemented, payroll management system, package, program, module, or application, as discussed herein, and/or as known in the art at the time of filing, and/or as developed after the time of filing. A specific example of a payroll system is the payroll module of Quickbooks™, available from Intuit Inc. of Mountain View, Calif.

Herein, a computing system implemented tax preparation system includes, but is not limited to, any computing system implemented tax preparation systems, applications, packages, programs, modules, websites, interfaces, or software systems, as discussed herein, and/or as known in the art at the time of filing, and/or as developed after the time of filing. A specific example of a computing system implemented tax preparation systems include Lacerte™ available from Intuit Inc. of Mountain View, Calif.

Herein, a computing system implemented business financial management system can be, but is not limited to, any of the following: an on-line, and/or web-based, and/or computing system implemented, business financial management system, package, program, module, or application; an on-line, and/or web-based, and/or computing system implemented, business inventory system, package, program, module, or application; an on-line, and/or web-based, and/or computing system implemented business asset management system, package, program, module, or application; an on-line, and/or web-based, and/or computing system implemented, business accounting system, package, program, module, or application; and/or any of the numerous on-line, and/or web-based, and/or computing system implemented, business financial management systems discussed herein and/or as known in the art at the time of filing. A specific example of a computing system implemented business financial management system is Quickbooks™, available from Intuit Inc. of Mountain View, Calif., and/or various other computing system implemented business financial management systems discussed herein, and/or known to those of skill in the art at the time of filing, and/or as developed after the time of filing.

In one embodiment, payroll data for each employee is automatically obtained from the one or more data management systems accessible by the process for providing an automatic and integrated R&D tax credit program, such as a computing system implemented, and/or web-based, small business payroll management system used by the client business, or by the accounting professional on behalf of the client business.

In various embodiments, the accounting professional is prompted by the process for providing an automatic and integrated R&D tax credit program to obtain, and/or provide, any missing employee R&D activity data and payroll data for each employee. In various embodiments, the accounting professional is alerted to any employee R&D activity data and/or payroll data that appear to be in error, incomplete, or inaccurate.

In one embodiment, the employee R&D activity data and employee payroll data for each employee is used to calculate R&D qualification percentage data indicating the percent of the employee's time devoted to qualified R&D and the cost of the employee's time devoted to qualified R&D. In one embodiment, the cost to the client business of each employee's time devoted to qualified R&D is aggregated to determine a total cost to the client business of all employee time devoted to qualified R&D.

In various embodiments, data indicating the cost to the client business of each employee's time devoted to qualified R&D, and/or data indicating a total cost to the client business of all employee time devoted to qualified R&D, is then stored using any data storage method, means, mechanism, process, and/or procedure, as discussed herein, and/or as known in the art at the time of filing, and/or as developed after the time of filing.

In various embodiments, the cost to the client business of each employee's time devoted to qualified R&D, and/or the aggregated total cost to the client business of all employee time devoted to qualified R&D, is calculated based on various formulas and/or statutory rules for determining the R&D tax credit.

For instance, in one illustrative example of one embodiment, the database interface system/application is programmed such that the statutory 80% rule is applied, e.g., if 80% of an employee's time qualifies for the R&D tax credit, then 80% can be rounded up to 100%.

As another example, in one illustrative example of one embodiment, the database interface system/application is programmed such that the statutory "direct supervision and direct support rule" is applied whereby if a given employee is deemed to have time that qualifies for the R&D tax credit, the given employee's direct reports and/or manger are also deemed to have time that qualifies for the R&D tax credit. In one embodiment, Human Resources data, such as organization chart data, is used to implement the direct supervision and direct support rule.

In various embodiments, the accounting professional is prompted by the process for providing an automatic and integrated R&D tax credit program to obtain, and/or provide, any missing employee R&D activity data, such as the absence of employee R&D activity data from a given employee. In various embodiments, the accounting professional is alerted to any R&D cost to the client business data that appears to be in error, incomplete, or inaccurate.

As noted above, in one embodiment, access to one or more data management systems used by, or associated with, the client of the accounting professional, and/or the accounting professional, is provided to the process for providing an automatic and integrated R&D tax credit program.

In one embodiment, R&D tax credit qualification rules/requirements data is automatically obtained from the one or more data management systems accessible by the process for providing an automatic and integrated R&D tax credit program, such as a computing system implemented, and/or web-based, tax preparation system used by the client business.

In one embodiment, R&D tax credit qualification rules/requirements data is automatically obtained from the one or more other sources of the data such as, but not limited to, tax code data and/or other government resources and/or databases.

In various embodiments, the accounting professional is prompted by the process for providing an automatic and integrated R&D tax credit program to obtain, and/or provide, any missing R&D tax credit qualification rules/requirements data. In various embodiments, the accounting professional is alerted to any R&D tax credit qualification rules/requirements data that appears to be outdated, in error, incomplete, or inaccurate.

In one embodiment, R&D tax credit related operational/financial data for the client business is also automatically obtained from the one or more data management systems accessible by the process for providing an automatic and integrated R&D tax credit program such as a computing system implemented, and/or web-based, small business financial management system used by the client business.

In one embodiment, R&D tax credit related operational/financial data for the client business is obtained from the one or more other sources such as, but not limited to, historical filings data, and/or the accounting professional, or one or more other accounting professionals.

In various embodiments, the R&D tax credit related operational/financial data includes, but is not limited to, contractor payment/cost data, R&D related supplies cost data, gross sales data, fixed base percentage (as defined by statute) data, and/or any other the R&D tax credit related operational/financial data desired and/or as deemed necessary.

In various embodiments, the accounting professional is prompted by the process for providing an automatic and integrated R&D tax credit program to obtain, and/or provide, any missing R&D tax credit related operational/financial data. In various embodiments, the accounting professional is alerted to any R&D tax credit related operational/financial data that appears to be outdated, in error, incomplete, or inaccurate.

In various embodiments, a chat room is provided to the accounting professional through the process for providing an automatic and integrated R&D tax credit program. In one embodiment, the accounting professional can discuss various R&D tax credit calculation issues with other accounting professionals and/or employees of the provider of the process for providing an automatic and integrated R&D tax credit program via the provided chat room.

In one embodiment, the aggregated total cost of employee time devoted to qualified R&D data for the client business, the R&D tax credit qualification rules/requirements data for the client business, and/or the R&D tax credit related operational/financial data for the client business is used to automatically calculate the R&D tax credit for the client business.

In one embodiment, the data indicating calculated the R&D tax credit for the client business is then securely stored and safeguarded using any data storage method, means, mechanism, process, and/or procedure, as discussed herein, and/or as known in the art at the time of filing, and/or as developed after the time of filing.

In various embodiments, the accounting professional is prompted by the process for providing an automatic and integrated R&D tax credit program to obtain, and/or provide, any missing aggregated total cost of employee time devoted to qualified R&D data for the client business, R&D tax credit qualification rules/requirements data for the client business, and/or the R&D tax credit related operational/financial data for the client business. In various embodiments, the accounting professional is alerted to any calculated R&D tax credit data that appears to be in error, incomplete, or inaccurate.

In various embodiments, the process for providing an automatic and integrated R&D tax credit program generates, and provides the accounting professional, and/or the client business, data, documents, and/or reports including salient R&D related facts such as, but not limited to: data indicating the R&D tax credit methodology used; data indicating the fixed base percentage; data indicating average sales over 4 years, or any other period of time; data representing acquisition related information; data representing any historical information; and/or data representing benchmarking information related to businesses/firms in similar industries.

In one embodiment, data representing the calculated R&D tax credit for the client business is automatically transferred to one or more data management systems accessible by the process for providing an automatic and integrated R&D tax credit program, such as a computing system implemented, and/or web-based, tax preparation system used by the client business.

In one embodiment, the data representing the calculated R&D tax credit for the client business is then automatically used to auto-fill one or more tax forms to be submitted by, or on behalf of, the client business. Consequently, in one embodiment, the process for providing an automatic and integrated R&D tax credit program automatically completes IRS and State R&D tax credit forms by automatically linking R&D tax credit calculations to IRS forms.

In one embodiment, all, or part of: the collected employee R&D activity data for each employee; the aggregated total cost of employee time devoted to qualified R&D data for the client business; the R&D tax credit qualification rules/requirements data for the client business; the R&D tax credit related operational/financial data for the client business; the calculated R&D tax credit data; data indicating the methods used to calculate the R&D tax credit for the client business, and any other salient R&D related facts data; and/or any other evidentiary data supporting the calculated, and claimed, R&D tax credit, is automatically correlated and securely stored and safeguarded for use in further analysis, and/or in the event of an audit, and/or a merger or acquisition, and/or for any other purpose desired and/or required.

In one embodiment, all, or part of: the collected employee R&D activity data for each employee; the aggregated total cost of employee time devoted to qualified R&D data for the client business; the R&D tax credit qualification rules/requirements data for the client business; the R&D tax credit related operational/financial data for the client business; the calculated R&D tax credit data; data indicating the methods used to calculate the R&D tax credit for the client business, and any other salient R&D related facts data; and/or any other evidentiary data supporting the calculated, and claimed, R&D tax credit, is automatically correlated and securely stored for access by only explicitly authorized parties for use in further analysis, and/or in the event of an audit.

Consequently, in one embodiment, the process for providing an automatic and integrated R&D tax credit program automatically, and securely, stores, and limits access to, the necessary audit source documentation in a self-contained, organized, secure data room where the accounting professional, or other authorized party, can access the necessary documentation for audit purposes.

Using the process for providing an automatic and integrated R&D tax credit program, as discussed herein, accounting professionals can offer their small business clients an efficient, consistent, and resource conserving, process for identifying, documenting, and calculating, R&D tax credits and securely storing the supporting evidentiary data and documents for use in the event of an audit, merger and acquisition, and/or for various other purposes desired and/or required.

In addition, in one embodiment, the activity questions of the R&D project/activity survey tools are specifically crafted to be easily understandable and meaningful to both the survey taker and the IRS to increase the employee survey response rate as well as IRS acceptance rate. In addition, in one embodiment, the R&D project/activity survey tools are customized based on industry and company.

As a result, using the process for providing an automatic and integrated R&D tax credit program, as discussed herein, accounting professionals can provide their small business clients an efficient and consistent program and process to determine and maximize R&D tax credits they legitimately claim, and a system to apply for the R&D tax credits, without devoting unreasonable resources to the program, and with minimized risk of incorrectly claiming an R&D tax credit. Consequently, the process for providing an automatic and integrated R&D tax credit program, as discussed herein, supports and facilitates the positive goals of R&D tax credits to encourage United States research and development, to ensure the United States remains technologically competitive globally, and to give a business more capital to invest in R&D.

Hardware Architecture

FIG. 1 shows a block diagram of an exemplary hardware system 100 suitable for implementing one embodiment of a process for providing an automatic and integrated R&D tax credit program, such as exemplary process 200 of FIG. 2, discussed below.

Returning to FIG. 1, exemplary hardware system 100 includes: a client business financial management system 150, e.g., a client computing system implementing a business financial management system/application or a business financial management system; a client tax preparation system 300, e.g., a client computing system implementing a tax preparation system/application or a business financial management system/application; client payroll system 400, e.g., a client computing system implementing a payroll system/application or a payroll system/application; a database interface system 500, e.g., a computing system implementing a database interface system/application or a database interface system/application; a client employee system 550, e.g., a computing system accessible by a client employee and capable of accessing database interface system 500; an accounting professional, and/or process, system 600, e.g., a computing system implementing at least part of a process for providing an automatic and integrated R&D tax credit program and/or a process for providing an automatic and integrated R&D tax credit program; and a database 170 all communicating via communication interfaces 152, 322, 422, 522, 552, 622, and communication channels 700A, 700B, 700C, 700D, 700E, and 700F.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, client business financial management system 150 is representative of one or more computing systems. In one embodiment, client business financial management system 150 is a server computing system that is, in turn, associated with one or more client computing systems and provides access to one or more computing system implemented business financial management systems (not shown), that generate R&D tax credit related operational/financial data, such as client operational/financial data 151. In one embodiment, client business financial management system 150 is a client computing system and includes all of, or part of, one or more computing system implemented business financial management systems and/or R&D tax credit related operational/financial data associated with a client of an accounting professional.

In one embodiment, client business financial management system 150 is representative of a web-site and/or web-based function for providing access to one or more computing system implemented business financial management systems and/or R&D tax credit related operational/financial data associated with a client of an accounting professional.

In one embodiment, client business financial management system 150 is part of a cloud computing environment. In one embodiment, client business financial management system 150 is accessible by accounting professional, and/or process, system 600, and/or a process for providing an automatic and integrated R&D tax credit program.

In various embodiments, client business financial management system 150 can be any computing system as defined herein, and/or as known in the art at the time of filing, and/or as developed thereafter, that includes components that can execute all, or part, of a process for providing an automatic and integrated R&D tax credit program in accordance with at least one of the embodiments as described herein.

In one embodiment, client tax preparation system 300 is representative of one or more computing systems. In one embodiment, client tax preparation system 300 is a server computing system that is, in turn, associated with one or more client computing systems and provides access to one or more computing system implemented tax preparation systems (not shown), that generate R&D tax credit qualification rules/requirements data, such as client tax data 301. In one embodiment, client tax preparation system 300 is a client computing system and includes all, or part of, one or more computing system implemented tax preparation systems and/or R&D tax credit qualification rules/requirements data associated with a client of an accounting professional.

In one embodiment, client tax preparation system 300 is representative of a web-site and/or web-based function for providing access to one or more computing system implemented tax preparation systems and/or R&D tax credit qualification rules/requirements data associated with a client of an accounting professional.

In one embodiment, client tax preparation system 300 is part of a cloud computing environment. In one embodiment, client tax preparation system 300 is accessible by accounting professional, and/or process, system 600, and/or a process for providing an automatic and integrated R&D tax credit program.

In various embodiments, client tax preparation system 300 can be any computing system as defined herein, and/or as known in the art at the time of filing, and/or as developed thereafter, that includes components that can execute all, or part, of a process for providing an automatic and integrated R&D tax credit program in accordance with at least one of the embodiments as described herein.

In one embodiment, client payroll system 400 is representative of one or more computing systems. In one embodiment, client payroll system 400 is a server computing system that is, in turn, associated with one or more client computing systems and provides access to one or more computing system implemented payroll management systems (not shown), that generate payroll data, such as client payroll data 401. In one embodiment, client payroll system 400 is a client computing system and includes all, or part of, one or more computing system implemented payroll management systems and/or payroll data associated with a client of an accounting professional.

In one embodiment, client payroll system 400 is representative of a web-site and/or web-based function for providing access to one or more computing system implemented payroll management systems and/or payroll data associated with a client of an accounting professional.

In one embodiment, client payroll system 400 is part of a cloud computing environment. In one embodiment, client payroll system 400 is accessible by accounting professional, and/or process, system 600, and/or a process for providing an automatic and integrated R&D tax credit program.

In various embodiments, client payroll system 400 can be any computing system as defined herein, and/or as known in the art at the time of filing, and/or as developed thereafter, that includes components that can execute all, or part, of a process for providing an automatic and integrated R&D tax credit program in accordance with at least one of the embodiments as described herein.

In one embodiment, database interface system 500 is representative of one or more computing systems and/or database interface systems. In one embodiment, database interface system 500 is associated with one or more client computing systems and provides access to one or more database systems, that provide employee R&D activity data entry/display, such as employee R&D activity data 501, and/or R&D survey tools data and employee R&D project/activity survey forms data, such as R&D survey tools data 601.

In one embodiment, database interface system 500 is representative of a web-site and/or web-based function for providing access to, and entry of, employee R&D activity data 501, and/or R&D survey tools data and employee R&D project/activity survey forms data, such as R&D survey tools data 601.

In one embodiment, database interface system 500 is part of a cloud computing environment. In one embodiment, database interface system 500 is accessible by client employee system 550 and/or accounting professional, and/or process, system 600, and/or a process for providing an automatic and integrated R&D tax credit program.

In one embodiment, client employee system 550 is representative of one or more computing systems. In one embodiment, client employee system 550 provides a client employee access to database interface system 500 and R&D project/activity survey tools data, such as R&D survey tools data 601. In one embodiment, client employee system 550 provides a client employee access to database interface system 500 and a means for the entry of employee R&D activity data 501 into database interface system 500.

In one embodiment, client employee system 550 is part of a cloud computing environment. In one embodiment, client employee system 550 is accessible by accounting professional, and/or process, system 600, and/or a process for providing an automatic and integrated R&D tax credit program.

In various embodiments, client employee system 550 can be any computing system as defined herein, and/or as known in the art at the time of filing, and/or as developed thereafter, that includes components that can execute all, or part, of a process for providing an automatic and integrated R&D tax credit program in accordance with at least one of the embodiments as described herein.

In one embodiment, accounting professional, and/or process, system 600 is representative of one or more computing systems. In one embodiment accounting professional, and/or process, system 600 is part of a cloud computing environment. In various embodiments, accounting professional, and/or process, system 600 can be any computing system as defined herein, and/or as known in the art at the time of filing, and/or as developed thereafter, that includes components that can execute all, or part, of a process for providing an automatic and integrated R&D tax credit program in accordance with at least one of the embodiments as described herein.

In one embodiment accounting professional, and/or process, system 600 provides R&D survey tools data 601 that includes R&D survey tools data and employee R&D project/activity survey forms data, to database interface system 500.

In one embodiment, accounting professional, and/or process, system 600 receives employee R&D activity data 501 from client employee system 550 and through database interface system 500 and R&D survey tools data 601.

In one embodiment, accounting professional, and/or process, system 600 receives client payroll data 401 from client payroll system 400. In one embodiment, accounting professional, and/or process, system 600 receives client tax data 301 from client tax preparation system 300. In one embodiment, accounting professional, and/or process, system 600 receives client financial data 151 from client business financial management system 150.

In one embodiment, employee R&D activity data 501, client payroll data 401, client tax data 301, and client financial data 151, are used as inputs to R&D tax credit engine 610. In one embodiment, R&D tax credit engine 610 transforms employee R&D activity data 501, client payroll data 401, client tax data 301, and client financial data 151, into client R&D tax credit data 611 and client audit data 613.

In one embodiment accounting professional, and/or process, system 600 provides client R&D tax credit data 611 to one or more tax forms of the client tax forms data 305 of the client tax preparation system 300.

In one embodiment accounting professional, and/or process, system 600 provides client audit data 613 to database 170 for storage.

In one embodiment, database 170 is a data storage device, a designated server system or computing system, or a designated portion of one or more server systems or computing systems, or a distributed database, or an external and/or portable hard drive. In one embodiment, database 170 is a dedicated mass storage device implemented in software, hardware, or a combination of hardware and software. In one embodiment, database 170 is a web-based function. In one embodiment, database 170 is part of a cloud computing environment.

In various embodiments, any, or all, of communication channels 700A, 700B, 700C, 700D, 700E, and 700F can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

In one embodiment, one or more of the client business financial management system 150, client tax preparation system 300, client payroll system 400, database interface system 500, client employee system 550, accounting professional, and/or process, system 600, and database 170 are part of a cloud computing environment.

Those of skill in the art will readily recognize that the components shown in FIG. 1, such as: client business financial management system 150; client tax preparation system 300; client payroll system 400; database interface system 500; client employee system 550; accounting professional, and/or process, system 600; and database 170, and their respective components, are shown for illustrative purposes only and that architectures with more or fewer components can implement, and benefit from, one or more embodiments. Moreover, one or more components may be located remotely from their respective system.

Process

As used herein, the term "employee" includes, but is not limited to: salaried workers and/or service providers; hourly workers and/or service providers; full time workers and/or service providers; part time workers and/or service providers; contracted workers and/or service providers, or "contractors"; and/or any other workers and/or service providers who are provided some form of compensation for their time and services.

Herein, a computing system implemented business financial management system can be, but is not limited to, any of the following: an on-line, and/or web-based, and/or computing system implemented business financial management system, package, program, module, or application; an on-line, and/or web-based, and/or computing system implemented business inventory system, package, program, module, or application; an on-line, and/or web-based, and/or computing system implemented business asset management system, package, program, module, or application; an on-line, and/or web-based, and/or computing system implemented business accounting system, package, program, module, or application; an on-line, and/or web-based, and/or computing system implemented payroll management system, package, program, module, or application; and/or any of the numerous on-line, and/or web-based, and/or computing system implemented business financial management systems discussed herein and/or as known in the art at the time of filing.

A specific example of computing system implemented business financial management system is Quickbooks™, available from Intuit Inc. of Mountain View, Calif., and/or various other computing system implemented business financial management systems discussed herein, and/or known to those of skill in the art at the time of filing, and/or as developed after the time of filing.

Herein, a "payroll system" is any an on-line, and/or web-based, and/or computing system implemented payroll management system, package, program, module, or application, as discussed herein, and/or as known in the art at the time of filing, and/or as developed after the time of filing.

A specific example of computing system implemented business financial management system is Quickbooks™, available from Intuit Inc. of Mountain View, Calif., and/or various other computing system implemented business financial management systems discussed herein, and/or known to those of skill in the art at the time of filing, and/or as developed after the time of filing.

Herein, a computing system implemented tax preparation system includes, but is not limited to, any computing system implemented tax preparation systems, applications, packages, programs, modules, websites, interfaces, or software systems, as discussed herein, and/or as known in the art at the time of filing, and/or as developed after the time of filing.

A specific example of a computing system implemented tax preparation systems include Lacerte™, available from Intuit Inc. of Mountain View, Calif.

Herein a "database interface system" includes, but is not limited to, any database applications implemented to interface with a centralized database that provides for the viewing, and input of, data, forms, documents, and various other multimedia sources and correlates the data, forms, and documents within one or more organizational systems. In various embodiments, database interface systems interface with databases implemented via one or more computing systems and accessed via the cloud, or any other network or data source.

A specific example of a database interface system is QuickBase™ available from Intuit Inc. of Mountain View Calif.

Herein the term "computing system implemented" as used, for instance in the terms: "computing system implemented data management system", "computing system implemented business financial management system", "computing system implemented tax preparation system", and "computing system implemented payroll system" is used to include both traditional computing system implemented systems and "online" or "web-based" systems.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, one or more R&D project/activity survey tools that both identify and classify qualified R&D tax credit projects and activities are generated and used to obtain employee R&D activity data from the employees of a business. Payroll data for the employees is then automatically obtained form a a payroll management system and the employee R&D activity data and employee payroll data is used to determine the qualified R&D cost to a business of all employee time devoted to qualified R&D work. R&D tax credit qualification data for the business is also automatically obtained. The qualified R&D cost data and the R&D tax credit qualification data for the business is then used to automatically calculate the R&D tax credit for the business. Any evidentiary data supporting the calculated R&D tax credit data is then automatically correlated and securely stored with restricted access.

In one embodiment, the process for providing an automatic and integrated R&D tax credit program is provided access to the collected employee R&D activity data.

In one embodiment, payroll data for each employee is automatically obtained from the one or more data management systems accessible by the process for providing an automatic and integrated R&D tax credit program, such as a computing system implemented, and/or web-based, payroll management system used by the client business. In one embodiment, each employee's and each contractor's percentage of time spent performing qualified R&D activity is linked automatically to each employee's payroll data, and each contractor's cost data, thus enabling the program to automatically calculate the R&D qualifying costs and the R&D tax credit.

Figure 2:
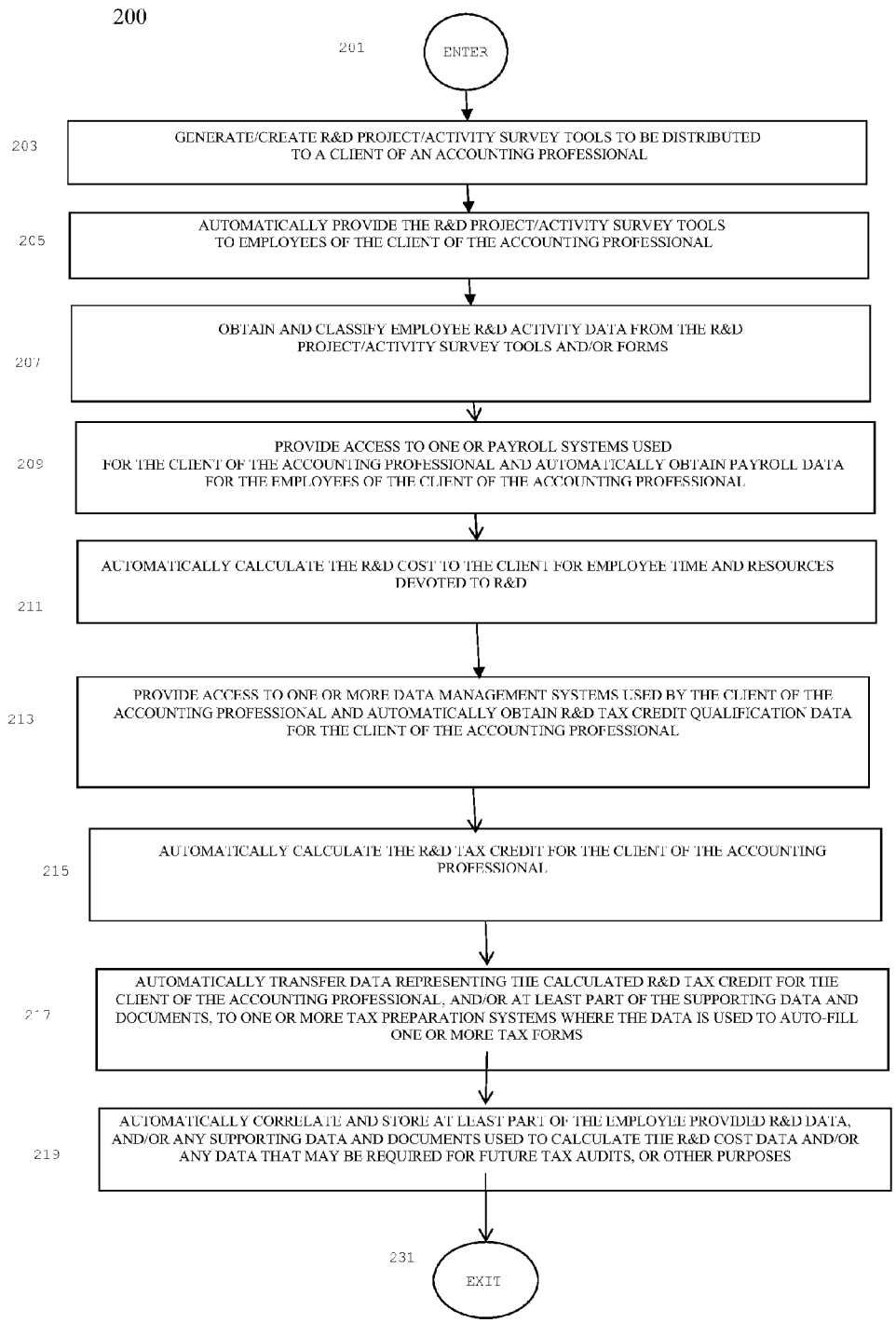
FIG. 2 is a flow chart depicting one example of a process for providing an automatic and integrated R&D tax credit program in accordance with one embodiment.

FIG. 2 a flow chart depicting a process for providing an automatic and integrated R&D tax credit program 200 in accordance with one embodiment. Process for providing an automatic and integrated R&D tax credit program 200 begins at ENTER OPERATION 201 of FIG. 2 and process flow proceeds to GENERATE/CREATE R&D PROJECT/ACTIVITY SURVEY TOOLS TO BE DISTRIBUTED TO A CLIENT OF AN ACCOUNTING PROFESSIONAL OPERATION 203.

In one embodiment, at GENERATE/CREATE R&D PROJECT/ACTIVITY SURVEY TOOLS TO BE DISTRIBUTED TO A CLIENT OF AN ACCOUNTING PROFESSIONAL OPERATION 203 one or more standardized R&D project/activity survey tools are created that both identify and classify qualified R&D tax credit projects and activities and the one or more standardized R&D project/activity survey tools are made available to an accounting professional, and/or a client of the accounting professional.

In various embodiments, the standardized R&D project/activity survey tools of GENERATE/CREATE R&D PROJECT/ACTIVITY SURVEY TOOLS TO BE DISTRIBUTED TO A CLIENT OF AN ACCOUNTING PROFESSIONAL OPERATION 203 include, but are not limited to, one or more pre-created and standardized employee R&D project/activity survey forms.

In one embodiment, the employee R&D project/activity survey forms of GENERATE/CREATE R&D PROJECT/ACTIVITY SURVEY TOOLS TO BE DISTRIBUTED TO A CLIENT OF AN ACCOUNTING PROFESSIONAL OPERATION 203 are standardized forms generated for defined business types, industries, and/or markets. In one embodiment, multiple standardized employee R&D project/activity survey forms are provided to an accounting professional and/or a client business of an accounting professional as choices at GENERATE/CREATE R&D PROJECT/ACTIVITY SURVEY TOOLS TO BE DISTRIBUTED TO A CLIENT OF AN ACCOUNTING PROFESSIONAL OPERATION 203. In one embodiment, the accounting professional, and/or a client business of the accounting professional, then select the appropriate pre-created standardized form depending upon the business type, industries, and/or market of client business.

In one embodiment, the employee R&D project/activity survey forms of GENERATE/CREATE R&D PROJECT/ACTIVITY SURVEY TOOLS TO BE DISTRIBUTED TO A CLIENT OF AN ACCOUNTING PROFESSIONAL OPERATION 203 are updated periodically from information collected from ongoing live data of client businesses and/or information collected from other sources.

In various embodiments, the employee R&D project/activity survey forms of GENERATE/CREATE R&D PROJECT/ACTIVITY SURVEY TOOLS TO BE DISTRIBUTED TO A CLIENT OF AN ACCOUNTING PROFESSIONAL OPERATION 203 are editable and can be customized by the accounting professional and/or a client business of the accounting professional. Consequently, in one embodiment, an accounting professional is provided the capability to provide client businesses with standardized employee R&D project/activity survey forms categorized by client business type, industries, and/or markets, and/or as customized by the accounting professional and/or the client business.

In one embodiment, the employee R&D project/activity survey forms of GENERATE/CREATE R&D PROJECT/ACTIVITY SURVEY TOOLS TO BE DISTRIBUTED TO A CLIENT OF AN ACCOUNTING PROFESSIONAL OPERATION 203 include an R&D project/activity coding system and pre-coded survey activities/questions regarding potential R&D activity that are pre-determined as qualified activities for R&D tax credits. In various embodiments, the predefined R&D activity codes are editable and can be modified by the accounting professional and/or one or more client businesses of the accounting professional.

In one embodiment, the employee R&D project/activity survey forms of GENERATE/CREATE R&D PROJECT/ACTIVITY SURVEY TOOLS TO BE DISTRIBUTED TO A CLIENT OF AN ACCOUNTING PROFESSIONAL OPERATION 203 are specifically generated to be accessed, and completed, by employees of the client business. As discussed below, in various embodiments, the employee R&D project/activity survey forms are designed to link employee project/activity information with other information obtained by process for providing an automatic and integrated R&D tax credit program 200.

In one embodiment, the employee R&D project/activity survey forms of GENERATE/CREATE R&D PROJECT/ACTIVITY SURVEY TOOLS TO BE DISTRIBUTED TO A CLIENT OF AN ACCOUNTING PROFESSIONAL OPERATION 203 include R&D activity questions that are specifically crafted to be easily understandable and meaningful to both the survey taker (e.g., the employees and/or contractors of the client business) and the IRS to increase the employee survey response rate as well as IRS acceptance rate.

In one embodiment, the R&D project/activity survey tools of GENERATE/CREATE R&D PROJECT/ACTIVITY SURVEY TOOLS TO BE DISTRIBUTED TO A CLIENT OF AN ACCOUNTING PROFESSIONAL OPERATION 203 include, but are not limited to, audio, video, or text-based, R&D tax credit tutorials that explain to the employees of the client business the purpose of the employee R&D project/activity survey forms, and/or any other R&D project/activity survey tools. In various embodiments, the R&D tax credit tutorials of GENERATE/CREATE R&D PROJECT/ACTIVITY SURVEY TOOLS TO BE DISTRIBUTED TO A CLIENT OF AN ACCOUNTING PROFESSIONAL OPERATION 203 include instructions regarding what qualifies as R&D project/activity and/or for R&D tax credit and how the R&D tax credit program works.

In various embodiments, the R&D tax credit tutorials of GENERATE/CREATE R&D PROJECT/ACTIVITY SURVEY TOOLS TO BE DISTRIBUTED TO A CLIENT OF AN ACCOUNTING PROFESSIONAL OPERATION 203 include instructions for completing the employee R&D project/activity survey forms and an explanation of the R&D project activity codes and coding system.

Consequently, in various embodiments, the R&D tax credit tutorials of GENERATE/CREATE R&D PROJECT/ACTIVITY SURVEY TOOLS TO BE DISTRIBUTED TO A CLIENT OF AN ACCOUNTING PROFESSIONAL OPERATION 203 provide employees with an understandable explanation of what projects/activities qualify for R&D tax credit and provides the employees with a meaningful, convenient, and intuitive method for providing contemporaneous employee R&D project/activity data that makes the collection, and documentation, of employee R&D project activity data relatively consistent, efficient, easy, and user-friendly.

In various embodiments, any other R&D project/activity survey tools are generated at GENERATE/CREATE R&D PROJECT/ACTIVITY SURVEY TOOLS TO BE DISTRIBUTED TO A CLIENT OF AN ACCOUNTING PROFESSIONAL OPERATION 203 as desired by the provider of process for providing an automatic and integrated R&D tax credit program 200.

In one embodiment, once one or more standardized R&D project/activity survey tools are generated and made available to an accounting professional, and/or a client of the accounting professional, at GENERATE/CREATE R&D PROJECT/ACTIVITY SURVEY TOOLS TO BE DISTRIBUTED TO A CLIENT OF AN ACCOUNTING PROFESSIONAL OPERATION 203, process flow proceeds to AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205.

In one embodiment, at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 the R&D project/activity survey tools of GENERATE/CREATE R&D PROJECT/ACTIVITY SURVEY TOOLS TO BE DISTRIBUTED TO A CLIENT OF AN ACCOUNTING PROFESSIONAL OPERATION 203 are provided to employees of a client business of the accounting professional.

The one embodiment, at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 the R&D project/activity survey tools are provided to employees of a client business through one or more database interface systems, such as database interface system 500 of FIG. 1 made available to the employees of the client business through client employee systems, such as client employee system 550 of FIG. 1, by the client and/or the accounting professional.

Returning to FIG. 2, in various embodiments, the one or more database interface systems through which the R&D project/activity survey tools are provided to employees of a client business at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 include, but are not limited to, one or more database applications implemented to interface with a centralized database that provides for the viewing, and input of, data, forms, documents, and various other multimedia sources and correlates the data, forms, and documents within one or more organizational systems. In various embodiments, the one or more database interface systems interface with databases implemented via one or more computing systems and accessed via the cloud, or any other network or data source.

A specific example of a database interface system is QuickBase™ available from Intuit Inc. of Mountain View Calif.

In one embodiment, at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 the employee R&D project/activity survey forms are provided to the employees of the client business through a database interface system implemented, and/or maintained by, the provider of process for providing an automatic and integrated R&D tax credit program 200. In one embodiment, the employee R&D project/activity survey forms are provided to the employees of the client business through a database interface system implemented, and/or maintained by, the client business. In one embodiment, the employee R&D project/activity survey forms are provided to the employees of the client business through a database interface system implemented, and/or maintained by, and/or associated with, the accounting professional. In one embodiment, the employee R&D project/activity survey forms are provided to the employees of the client business through a database interface system implemented, and/or maintained by, and/or associated with, a third party on behalf of the accounting professional and/or the client business.

In various embodiments, at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205, R&D tax credit tutorials are also provided to the employees of the client business through the database interface system.

In various embodiments, the employees of the client business are provided the opportunity to enter data into the employee R&D project/activity survey forms of AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 on an "as needed" basis, e.g., a daily basis, a weekly basis, a monthly basis, a quarterly basis, a yearly basis, etc.

In various embodiments, the employees of the client business are provided the opportunity to enter data into the employee R&D project/activity survey forms via any computing system as discussed herein, and/or as known/available in the art at the time of filing, and/or as developed after the time of filing.

Herein, the term "computing system" includes, but is not limited to, any computing system known in the art at the time of filing, and/or as developed after the time of filing, such as, but not limited to: a mobile computing system; a desktop computing system; a laptop computing system; a notebook computing system; a tablet computing system; a workstation; a two-way pager; a cellular telephone; a smart phone; a digital wireless telephone; a Personal Digital Assistant (PDA); a server computing system; an Internet appliance; and/or any other device, or any desired combination of these devices, that includes components that can execute all, or part, the operations and/or processes discussed herein in accordance with at least one of the embodiments as discussed herein, and/or as known in the art at the time of filing, and/or as developed after the time of filing.

In various embodiments, the employees of the client business can upload/attach various R&D qualification/evidentiary data and/or documents via a mobile computing system and/or a mobile application, such as a phone, and the database interface system.

Herein, the term "mobile computing system" includes, but not limited to: a mobile phone; a smart phone; a tablet; a notebook; a laptop; an internet appliance; any Short Message Service (SMS) capable system; or any other mobile computing system as discussed herein, and/or as known in the art at the time of filing, and/or as developed after the time of filing.

In one embodiment, at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 the employees of the client business are provided a chat room to discuss R&D tax credit related issues with other employees of the client business, and/or the accounting professional.

In some embodiments, at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 the employee response rate is monitored and response rate data is provided to the accounting professional, and/or the client of the accounting professional, on a periodic basis and/or on pre-defined dates or at pre-defined time intervals.

In various embodiments, at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 reminder messages are automatically generated and sent to employees of the client business to remind the employees of the client business to complete, and/or submit, the employee R&D project/activity survey forms.

In various embodiments, the reminder messages can be, but are not limited to, e-mail reminder messages, SMS reminder messages, phone reminder messages, and/or any form of reminder message as discussed herein, and/or as known in the art at the time of filing, and/or as developed after the time of filing.

In various embodiments, at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 the reminder messages are standardized reminder messages that are sent on a periodic basis such as daily, weekly, monthly, quarterly, etc. In some embodiments, the reminder messages are sent on defined dates corresponding the tax reporting dates and/or project completion dates, and/or any other date desired and/or identified.

In various embodiments, the reminder messages are standardized reminder messages provided by the process for providing an automatic and integrated R&D tax credit program. In various embodiments, the reminder messages are editable and can be modified by the accounting professional and/or the client business.

In various embodiments, the reminder messages of AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 are standardized reminder messages that are sent on a periodic basis such as daily, weekly, monthly, quarterly, etc. In some embodiments, the reminder messages are sent on defined dates corresponding the tax reporting dates and/or project completion dates, and/or any other date desired and/or identified.

In various embodiments, the reminder messages are standardized reminder messages provided by process for providing an automatic and integrated R&D tax credit program 200. In various embodiments, the reminder messages are editable and can be modified by the accounting professional and/or the client business.

In one embodiment, once the R&D project/activity survey tools of GENERATE/CREATE R&D PROJECT/ACTIVITY SURVEY TOOLS TO BE DISTRIBUTED TO A CLIENT OF AN ACCOUNTING PROFESSIONAL OPERATION 203 are provided to employees of a client business of the accounting professional at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205, process flow proceeds to OBTAIN AND CLASSIFY EMPLOYEE R&D ACTIVITY DATA FROM THE R&D PROJECT/ACTIVITY SURVEY TOOLS AND/OR FORMS OPERATION 207.

In one embodiment, at OBTAIN AND CLASSIFY EMPLOYEE R&D ACTIVITY DATA FROM THE R&D PROJECT/ACTIVITY SURVEY TOOLS AND/OR FORMS OPERATION 207 the employee R&D activity data provided through the R&D project/activity survey tools of GENERATE/CREATE R&D PROJECT/ACTIVITY SURVEY TOOLS TO BE DISTRIBUTED TO A CLIENT OF AN ACCOUNTING PROFESSIONAL OPERATION 203 provided to employees of a client business of the accounting professional at AUTOMATICALLY PROVIDE THE R&D PROJECT/ACTIVITY SURVEY TOOLS TO EMPLOYEES OF THE CLIENT OF THE ACCOUNTING PROFESSIONAL OPERATION 205 is automatically provided to process for providing an automatic and integrated R&D tax credit program 200 through the employee R&D project/activity survey forms, and/or other R&D project/activity survey tools, and the one or more database interface systems.

In various embodiments, at OBTAIN AND CLASSIFY EMPLOYEE R&D ACTIVITY DATA FROM THE R&D PROJECT/ACTIVITY SURVEY TOOLS AND/OR FORMS OPERATION 207 one or more database interface systems are made accessible by process for providing an automatic and integrated R&D tax credit program 200 and the collected employee R&D activity data is automatically obtained by process for providing an automatic and integrated R&D tax credit program 200.

In various embodiments, at OBTAIN AND CLASSIFY EMPLOYEE R&D ACTIVITY DATA FROM THE R&D PROJECT/ACTIVITY SURVEY TOOLS AND/OR FORMS OPERATION 207 the employee R&D activity data, such as employee R&D activity data 501 of FIG. 1, is automatically analyzed, and classified, using the provided coding system.

Returning to FIG. 2, in various embodiments, at OBTAIN AND CLASSIFY EMPLOYEE R&D ACTIVITY DATA FROM THE R&D PROJECT/ACTIVITY SURVEY TOOLS AND/OR FORMS OPERATION 207 the accounting professional is alerted to any employee R&D activity data that appears to be in error, incomplete, inaccurate, or extraordinary, based on historical input and analysis regarding the client business itself, and/or data from similarly situated companies, and/or client businesses.

In various embodiments, at OBTAIN AND CLASSIFY EMPLOYEE R&D ACTIVITY DATA FROM THE R&D PROJECT/ACTIVITY SURVEY TOOLS AND/OR FORMS OPERATION 207 the employee R&D activity data is automatically analyzed to determine the total time spent by each employee on qualifying R&D projects/activities.

In various embodiments, at OBTAIN AND CLASSIFY EMPLOYEE R&D ACTIVITY DATA FROM THE R&D PROJECT/ACTIVITY SURVEY TOOLS AND/OR FORMS OPERATION 207 the employee R&D activity data is then stored using any data storage method, means, mechanism, process, and/or procedure, as discussed herein, and/or as known in the art at the time of filing, and/or as developed after the time of filing.

In one embodiment, once the one or more database interface systems, and/or the employee R&D activity data, are made accessible by process for providing an automatic and integrated R&D tax credit program 200 and the employee R&D activity data is automatically provided to process for providing an automatic and integrated R&D tax credit program 200, at OBTAIN AND CLASSIFY EMPLOYEE R&D ACTIVITY DATA FROM THE R&D PROJECT/ACTIVITY SURVEY TOOLS AND/OR FORMS OPERATION 207 process flow proceeds to PROVIDE ACCESS TO ONE OR PAYROLL SYSTEMS USED FOR THE CLIENT OF THE ACCOUNTING PROFESSIONAL AND AUTOMATICALLY OBTAIN PAYROLL DATA FOR THE EMPLOYEES OF THE CLIENT OF THE ACCOUNTING PROFESSIONAL OPERATION 209.

In one embodiment, at PROVIDE ACCESS TO ONE OR PAYROLL SYSTEMS USED FOR THE CLIENT OF THE ACCOUNTING PROFESSIONAL AND AUTOMATICALLY OBTAIN PAYROLL DATA FOR THE EMPLOYEES OF THE CLIENT OF THE ACCOUNTING PROFESSIONAL OPERATION 209 access to one or more data management systems used by, or associated with, the client of the accounting professional, and/or the accounting professional, is provided to process for providing an automatic and integrated R&D tax credit program 200.

Herein, the term "data management system" includes, but is not limited to: any on-line, and/or web-based, and/or computing system implemented, payroll management system, package, program, module, or application; any on-line, and/or web-based, and/or computing system implemented, tax preparation system, package, program, module, or application; any on-line, and/or web-based, and/or computing system implemented, business financial management system, package, program, module, or application; and/or any on-line, and/or web-based, and/or computing system implemented, data processing system as discussed herein, and/or as known/available in the art at the time of filing, and/or as developed/made available after the time of filing.

Herein, a "payroll system" is any an on-line, and/or web-based, and/or computing system implemented, payroll management system, package, program, module, or application, as discussed herein, and/or as known in the art at the time of filing, and/or as developed after the time of filing. A specific example of a payroll system is the payroll module of Quickbooks™, available from Intuit Inc. of Mountain View, Calif.

Herein, a computing system implemented tax preparation system includes, but is not limited to, any computing system implemented tax preparation systems, applications, packages, programs, modules, websites, interfaces, or software systems, as discussed herein, and/or as known in the art at the time of filing, and/or as developed after the time of filing. A specific example of a computing system implemented tax preparation systems include Lacerte™ available from Intuit Inc. of Mountain View, Calif.

Herein, a computing system implemented business financial management system can be, but is not limited to, any of the following: an on-line, and/or web-based, and/or computing system implemented, business financial management system, package, program, module, or application; an on-line, and/or web-based, and/or computing system implemented, business inventory system, package, program, module, or application; an on-line, and/or web-based, and/or computing system implemented business asset management system, package, program, module, or application; an on-line, and/or web-based, and/or computing system implemented, business accounting system, package, program, module, or application; and/or any of the numerous on-line, and/or web-based, and/or computing system implemented, business financial management systems discussed herein and/or as known in the art at the time of filing.

A specific example of a computing system implemented business financial management system is Quickbooks™, available from Intuit Inc. of Mountain View, Calif., and/or various other computing system implemented business financial management systems discussed herein, and/or known to those of skill in the art at the time of filing, and/or as developed after the time of filing.

In one embodiment, at PROVIDE ACCESS TO ONE OR PAYROLL SYSTEMS USED FOR THE CLIENT OF THE ACCOUNTING PROFESSIONAL AND AUTOMATICALLY OBTAIN PAYROLL DATA FOR THE EMPLOYEES OF THE CLIENT OF THE ACCOUNTING PROFESSIONAL OPERATION 209 payroll data for each employee is automatically obtained from the one or more data management systems accessible by process for providing an automatic and integrated R&D tax credit program 200, such as a computing system implemented, and/or web-based, small business payroll management system, such as payroll management system 400 of FIG. 1, used by the client business, or by the accounting professional on behalf of the client business.

Returning to FIG. 2, in various embodiments, at PROVIDE ACCESS TO ONE OR PAYROLL SYSTEMS USED FOR THE CLIENT OF THE ACCOUNTING PROFESSIONAL AND AUTOMATICALLY OBTAIN PAYROLL DATA FOR THE EMPLOYEES OF THE CLIENT OF THE ACCOUNTING PROFESSIONAL OPERATION 209 the accounting professional is prompted by process for providing an automatic and integrated R&D tax credit program 200 to obtain, and/or provide, any missing employee R&D activity data and payroll data for each employee. In various embodiments, the accounting professional is alerted to any employee R&D activity data and/or payroll data that appear to be in error, incomplete, or inaccurate.

In one embodiment, once payroll data for each employee is automatically obtained from the one or more data management systems, such as a computing system implemented, and/or web-based, small business payroll management system used by the client business at PROVIDE ACCESS TO ONE OR PAYROLL SYSTEMS USED FOR THE CLIENT OF THE ACCOUNTING PROFESSIONAL AND AUTOMATICALLY OBTAIN PAYROLL DATA FOR THE EMPLOYEES OF THE CLIENT OF THE ACCOUNTING PROFESSIONAL OPERATION 209, process flow proceeds to AUTOMATICALLY CALCULATE THE R&D COST TO THE CLIENT FOR EMPLOYEE TIME AND RESOURCES DEVOTED TO R&D OPERATION 211.

In one embodiment, at AUTOMATICALLY CALCULATE THE R&D COST TO THE CLIENT FOR EMPLOYEE TIME AND RESOURCES DEVOTED TO R&D OPERATION 211 the employee R&D activity data of OBTAIN AND CLASSIFY EMPLOYEE R&D ACTIVITY DATA FROM THE R&D PROJECT/ACTIVITY SURVEY TOOLS AND/OR FORMS OPERATION 207 and the employee payroll data of PROVIDE ACCESS TO ONE OR PAYROLL SYSTEMS USED FOR THE CLIENT OF THE ACCOUNTING PROFESSIONAL AND AUTOMATICALLY OBTAIN PAYROLL DATA FOR THE EMPLOYEES OF THE CLIENT OF THE ACCOUNTING PROFESSIONAL OPERATION 209 is used to calculate R&D qualification percentage data indicating the percent of the employee's time devoted to qualified R&D and the cost of the employee's time devoted to qualified R&D.

In one embodiment, at AUTOMATICALLY CALCULATE THE R&D COST TO THE CLIENT FOR EMPLOYEE TIME AND RESOURCES DEVOTED TO R&D OPERATION 211 the cost to the client business of each employee's time devoted to qualified R&D is aggregated to determine a total cost to the client business of all employee time devoted to qualified R&D.

In various embodiments, at AUTOMATICALLY CALCULATE THE R&D COST TO THE CLIENT FOR EMPLOYEE TIME AND RESOURCES DEVOTED TO R&D OPERATION 211 data indicating the cost to the client business of each employee's time devoted to qualified R&D, and/or data indicating a total cost to the client business of all employee time devoted to qualified R&D, is stored using any data storage method, means, mechanism, process, and/or procedure, as discussed herein, and/or as known in the art at the time of filing, and/or as developed after the time of filing.

In various embodiments, at AUTOMATICALLY CALCULATE THE R&D COST TO THE CLIENT FOR EMPLOYEE TIME AND RESOURCES DEVOTED TO R&D OPERATION 211 the cost to the client business of each employee's time devoted to qualified R&D, and/or the aggregated total cost to the client business of all employee time devoted to qualified R&D, is calculated based on various formulas and/or statutory rules for determining the R&D tax credit.

For instance, in one illustrative example of one embodiment, the database interface system/application is programmed such that the statutory 80% rule is applied, e.g., if 80% of an employee's time qualifies for the R&D tax credit, then 80% can be rounded up to 100%.

As another example, in one illustrative example of one embodiment, the database interface system/application is programmed such that the statutory "direct supervision and direct support rule" is applied whereby if a given employee is deemed to have time that qualifies for the R&D tax credit, the given employee's direct reports and/or manger are also deemed to have time that qualifies for the R&D tax credit. In one embodiment, Human Resources data, such as organization chart data, is used to implement the direct supervision and direct support rule.

In various embodiments, at AUTOMATICALLY CALCULATE THE R&D COST TO THE CLIENT FOR EMPLOYEE TIME AND RESOURCES DEVOTED TO R&D OPERATION 211 the accounting professional is prompted by the process for providing an automatic and integrated R&D tax credit program to obtain, and/or provide, any missing employee R&D activity data, such as the absence of employee R&D activity data from a given employee. In various embodiments, the accounting professional is alerted to any R&D cost to the client business data that appears to be in error, incomplete, or inaccurate.

In one embodiment, once the employee R&D activity data of OBTAIN AND CLASSIFY EMPLOYEE R&D ACTIVITY DATA FROM THE R&D PROJECT/ACTIVITY SURVEY TOOLS AND/OR FORMS OPERATION 207 and the employee payroll data of PROVIDE ACCESS TO ONE OR PAYROLL SYSTEMS USED FOR THE CLIENT OF THE ACCOUNTING PROFESSIONAL AND AUTOMATICALLY OBTAIN PAYROLL DATA FOR THE EMPLOYEES OF THE CLIENT OF THE ACCOUNTING PROFESSIONAL OPERATION 209 is used to calculate R&D qualification percentage data indicating the percent of the employee's time devoted to qualified R&D and the cost of the employee's time devoted to qualified R&D, and/or the cost to the client business of each employee's time devoted to qualified R&D is aggregated to determine a total cost to the client business of all employee time devoted to qualified R&D, at AUTOMATICALLY CALCULATE THE R&D COST TO THE CLIENT FOR EMPLOYEE TIME AND RESOURCES DEVOTED TO R&D OPERATION 211, process flow proceeds to PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213.

In one embodiment, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 access to one or more data management systems used by, or associated with, the client of the accounting professional, and/or the accounting professional, is provided to process for providing an automatic and integrated R&D tax credit program 200 and R&D tax credit qualification rules/requirements data and/or R&D tax credit related operational/financial data for the client business is automatically obtained.

As noted above, in one embodiment, access to one or more data management systems used by, or associated with, the client of the accounting professional, and/or the accounting professional, is provided to process for providing an automatic and integrated R&D tax credit program 200.

In one embodiment, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 R&D tax credit qualification rules/requirements data is automatically obtained from the one or more data management systems accessible by process for providing an automatic and integrated R&D tax credit program 200, such as a computing system implemented, and/or web-based, tax preparation system used by the client business, such as tax preparation system 300 of FIG. 1.

As noted above, herein, a computing system implemented tax preparation system includes, but is not limited to, any computing system implemented tax preparation systems, applications, packages, programs, modules, websites, interfaces, or software systems, as discussed herein, and/or as known in the art at the time of filing, and/or as developed after the time of filing.

A specific example of a computing system implemented tax preparation systems include Lacerte™, available from Intuit Inc. of Mountain View, Calif.

Returning to FIG. 2, in one embodiment, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 R&D tax credit qualification rules/requirements data is automatically obtained from one or more other sources of the data such as, but not limited to, tax code data and/or other government resources and/or databases, and/or the accounting professional.

Returning to FIG. 2, in various embodiments, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 the accounting professional is prompted by process for providing an automatic and integrated R&D tax credit program 200 to obtain, and/or provide, any missing R&D tax credit qualification rules/requirements data.

In various embodiments, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 the accounting professional is alerted to any R&D tax credit qualification rules/requirements data that appears to be outdated, in error, incomplete, or inaccurate.

In one embodiment, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 R&D tax credit related operational/financial data for the client business is also automatically obtained from the one or more data management systems accessible by process for providing an automatic and integrated R&D tax credit program 200 such as a computing system implemented, and/or web-based, small business financial management system used by the client business, such as business financial management system 150 of FIG. 1.

As noted above, herein, a computing system implemented business financial management system can be, but is not limited to, any of the following: an on-line, and/or web-based, and/or computing system implemented business financial management system, package, program, module, or application; an on-line, and/or web-based, and/or computing system implemented business inventory system, package, program, module, or application; an on-line, and/or web-based, and/or computing system implemented business asset management system, package, program, module, or application; an on-line, and/or web-based, and/or computing system implemented business accounting system, package, program, module, or application; an on-line, and/or web-based, and/or computing system implemented payroll management system, package, program, module, or application; and/or any of the numerous on-line, and/or web-based, and/or computing system implemented business financial management systems discussed herein and/or as known in the art at the time of filing.

A specific example of a computing system implemented business financial management system is Quickbooks™, available from Intuit Inc. of Mountain View, Calif. and/or various other computing system implemented business financial management systems discussed herein, and/or known to those of skill in the art at the time of filing, and/or as developed after the time of filing.

In one embodiment, R&D tax credit related operational/financial data for the client business is obtained at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 from the one or more other sources such as, but not limited to, historical filings data, and/or the accounting professional, or one or more other accounting professionals.

Returning to FIG. 2, in various embodiments, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213, the R&D tax credit related operational/financial data includes, but is not limited to, contractor payment/cost data, R&D related supplies cost data, gross sales data, fixed base percentage (as defined by statute) data, and/or any other the R&D tax credit related operational/financial data desired and/or as deemed necessary.

In one embodiment, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 each contractor's cost information is obtained and each contractor's percentage of time spent performing qualified R&D activity is automatically linked to each contractor's cost information, thus enabling process for providing an automatic and integrated R&D tax credit program 200 to automatically calculate the R&D qualifying costs and the R&D tax credit.

In one embodiment, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 cost information associated with R&D related supplies is obtained and used by process for providing an automatic and integrated R&D tax credit program 200 to automatically calculate the R&D qualifying costs and the R&D tax credit.

In various embodiments, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 the accounting professional is prompted by process for providing an automatic and integrated R&D tax credit program 200 to obtain, and/or provide, any missing R&D tax credit related operational/financial data.

In various embodiments, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 the accounting professional is alerted to any R&D tax credit related operational/financial data that appears to be outdated, in error, incomplete, or inaccurate.

In various embodiments, at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 a chat room is provided to the accounting professional through the process for providing an automatic and integrated R&D tax credit program. In one embodiment, the accounting professional can discuss various R&D tax credit calculation issues with other accounting professionals and/or employees of the provider of process for providing an automatic and integrated R&D tax credit program 200 via the provided chat room.

In one embodiment, once access to one or more data management systems used by, or associated with, the client of the accounting professional, and/or the accounting professional, is provided to process for providing an automatic and integrated R&D tax credit program 200 and R&D tax credit qualification rules/requirements data and/or R&D tax credit related operational/financial data for the client business is automatically obtained at PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213, process flow proceeds to AUTOMATICALLY CALCULATE THE R&D TAX CREDIT FOR THE CLIENT OF THE ACCOUNTING PROFESSIONAL OPERATION 215.

In one embodiment, at AUTOMATICALLY CALCULATE THE R&D TAX CREDIT FOR THE CLIENT OF THE ACCOUNTING PROFESSIONAL OPERATION 215 the aggregated total cost of employee time devoted to qualified R&D data for the client business of AUTOMATICALLY CALCULATE THE R&D COST TO THE CLIENT FOR EMPLOYEE TIME AND RESOURCES DEVOTED TO R&D OPERATION 211 PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213, the R&D tax credit qualification rules/requirements data for the client business PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213, and/or the R&D tax credit related operational/financial data for the client business of PROVIDE ACCESS TO ONE OR MORE DATA MANAGEMENT SYSTEMS USED BY THE CLIENT OF THE ACCOUNTING PROFESSIONAL AND AUTOMATICALLY OBTAIN R&D TAX CREDIT QUALIFICATION DATA FOR THE CLIENT OF THE ACCOUNTING PROFESSIONAL OPERATION 213 is used to automatically calculate the R&D tax credit for the client business.

In one embodiment, at AUTOMATICALLY CALCULATE THE R&D TAX CREDIT FOR THE CLIENT OF THE ACCOUNTING PROFESSIONAL OPERATION 215 the data indicating calculated the R&D tax credit for the client business is then securely stored and safeguarded using any data storage method, means, mechanism, process, and/or procedure, as discussed herein, and/or as known in the art at the time of filing, and/or as developed after the time of filing.

In various embodiments, at AUTOMATICALLY CALCULATE THE R&D TAX CREDIT FOR THE CLIENT OF THE ACCOUNTING PROFESSIONAL OPERATION 215 the accounting professional is prompted by process for providing an automatic and integrated R&D tax credit program 200 to obtain, and/or provide, any missing aggregated total cost of employee time devoted to qualified R&D data for the client business, R&D tax credit qualification rules/requirements data for the client business, and/or the R&D tax credit related operational/financial data for the client business.

In various embodiments, at AUTOMATICALLY CALCULATE THE R&D TAX CREDIT FOR THE CLIENT OF THE ACCOUNTING PROFESSIONAL OPERATION 215 the accounting professional is alerted to any calculated R&D tax credit that appears to be in error, incomplete, or inaccurate.

In various embodiments, at AUTOMATICALLY CALCULATE THE R&D TAX CREDIT FOR THE CLIENT OF THE ACCOUNTING PROFESSIONAL OPERATION 215 a chat room is provided to the accounting professional through process for providing an automatic and integrated R&D tax credit program 200. In one embodiment, the accounting professional can discuss various R&D tax credit calculation issues with other accounting professionals and/or employees of the provider of process for providing an automatic and integrated R&D tax credit program via the provided chat room.

In various embodiments, at AUTOMATICALLY CALCULATE THE R&D TAX CREDIT FOR THE CLIENT OF THE ACCOUNTING PROFESSIONAL OPERATION 215 process for providing an automatic and integrated R&D tax credit program 200 generates, and provides the accounting professional, and/or the client business, data, documents, and/or reports including salient R&D related facts such as, but not limited to: data indicating the R&D tax credit methodology used; data indicating the fixed base percentage; data indicating average sales over 4 years, or any other period of time; data representing acquisition related information; data representing any historical information; and/or data representing benchmarking information related to businesses/firms in similar industries.

In one embodiment, once the aggregated total cost of employee time devoted to qualified R&D data for the client business, the R&D tax credit qualification rules/requirements data for the client business, and/or the R&D tax credit related operational/financial data for the client business, is used to automatically calculate the R&D tax credit for the client business at AUTOMATICALLY CALCULATE THE R&D TAX CREDIT FOR THE CLIENT OF THE ACCOUNTING PROFESSIONAL OPERATION 215, process flow proceeds to AUTOMATICALLY TRANSFER DATA REPRESENTING THE CALCULATED R&D TAX CREDIT FOR THE CLIENT OF THE ACCOUNTING PROFESSIONAL, AND/OR AT LEAST PART OF THE SUPPORTING DATA AND DOCUMENTS, TO ONE OR MORE TAX PREPARATION SYSTEMS WHERE THE DATA IS USED TO AUTO-FILL ONE OR MORE TAX FORMS OPERATION 217.

In one embodiment, at AUTOMATICALLY TRANSFER DATA REPRESENTING THE CALCULATED R&D TAX CREDIT FOR THE CLIENT OF THE ACCOUNTING PROFESSIONAL, AND/OR AT LEAST PART OF THE SUPPORTING DATA AND DOCUMENTS, TO ONE OR MORE TAX PREPARATION SYSTEMS WHERE THE DATA IS USED TO AUTO-FILL ONE OR MORE TAX FORMS OPERATION 217 data representing the calculated R&D tax credit for the client business of AUTOMATICALLY CALCULATE THE R&D TAX CREDIT FOR THE CLIENT OF THE ACCOUNTING PROFESSIONAL USING THE R&D COST DATA AND THE R&D TAX CREDIT QUALIFICATION DATA ASSOCIATED WITH THE CLIENT OF THE ACCOUNTING PROFESSIONAL OPERATION 215 is automatically transferred to one or more data management systems accessible by process for providing an automatic and integrated R&D tax credit program 200, such as a computing system implemented, and/or web-based, tax preparation system used by the client business, such as tax preparation system 300 of FIG. 1.

Returning to FIG. 2, in one embodiment, at AUTOMATICALLY TRANSFER DATA REPRESENTING THE CALCULATED R&D TAX CREDIT FOR THE CLIENT OF THE ACCOUNTING PROFESSIONAL, AND/OR AT LEAST PART OF THE SUPPORTING DATA AND DOCUMENTS, TO ONE OR MORE TAX PREPARATION SYSTEMS WHERE THE DATA IS USED TO AUTO-FILL ONE OR MORE TAX FORMS OPERATION 217 the data representing the calculated R&D tax credit for the client business is then automatically used to auto-fill one or more tax forms to be submitted by, or on behalf of, the client business. Consequently, in one embodiment, at AUTOMATICALLY CALCULATE THE R&D TAX CREDIT FOR THE CLIENT OF THE ACCOUNTING PROFESSIONAL USING THE R&D COST DATA AND THE R&D TAX CREDIT QUALIFICATION DATA ASSOCIATED WITH THE CLIENT OF THE ACCOUNTING PROFESSIONAL OPERATION 215 process for providing an automatic and integrated R&D tax credit program automatically 200 completes IRS and State R&D tax credit forms by automatically linking R&D tax credit calculations to IRS forms.

In one embodiment, once data representing the calculated R&D tax credit for the client business of AUTOMATICALLY CALCULATE THE R&D TAX CREDIT FOR THE CLIENT OF THE ACCOUNTING PROFESSIONAL USING THE R&D COST DATA AND THE R&D TAX CREDIT QUALIFICATION DATA ASSOCIATED WITH THE CLIENT OF THE ACCOUNTING PROFESSIONAL OPERATION 215 is automatically transferred to one or more data management systems accessible by process for providing an automatic and integrated R&D tax credit program 200, such as a computing system implemented, and/or web-based, tax preparation system used by the client business at AUTOMATICALLY TRANSFER DATA REPRESENTING THE CALCULATED R&D TAX CREDIT FOR THE CLIENT OF THE ACCOUNTING PROFESSIONAL, AND/OR AT LEAST PART OF THE SUPPORTING DATA AND DOCUMENTS, TO ONE OR MORE TAX PREPARATION SYSTEMS WHERE THE DATA IS USED TO AUTO-FILL ONE OR MORE TAX FORMS OPERATION 217, process flow proceeds to AUTOMATICALLY CORRELATE AND STORE AT LEAST PART OF THE EMPLOYEE PROVIDED R&D DATA, AND/OR ANY SUPPORTING DATA AND DOCUMENTS USED TO CALCULATE THE R&D COST DATA, AND/OR ANY DATA THAT MAY BE REQUIRED FOR FUTURE TAX AUDITS, OR OTHER PURPOSES OPERATION 219.

In one embodiment, at AUTOMATICALLY CORRELATE AND STORE AT LEAST PART OF THE EMPLOYEE PROVIDED R&D DATA, AND/OR ANY SUPPORTING DATA AND DOCUMENTS USED TO CALCULATE THE R&D COST DATA, AND/OR ANY DATA THAT MAY BE REQUIRED FOR FUTURE TAX AUDITS, OR OTHER PURPOSES OPERATION 219 all, or part of: the collected employee R&D activity data for each employee; the aggregated total cost of employee time devoted to qualified R&D data for the client business; the R&D tax credit qualification rules/requirements data for the client business; the R&D tax credit related operational/financial data for the client business; the calculated R&D tax credit data; data indicating the methods used to calculate the R&D tax credit for the client business, and any other salient R&D related facts data; and/or any other evidentiary data supporting the calculated, and claimed, R&D tax credit, is automatically correlated and securely stored and safeguarded for use in further analysis, and/or in the event of an audit, and/or a merger or acquisition, and/or for any other purpose desired and/or required.

In one embodiment, at AUTOMATICALLY CORRELATE AND STORE AT LEAST PART OF THE EMPLOYEE PROVIDED R&D DATA, AND/OR ANY SUPPORTING DATA AND DOCUMENTS USED TO CALCULATE THE R&D COST DATA, AND/OR ANY DATA THAT MAY BE REQUIRED FOR FUTURE TAX AUDITS, OR OTHER PURPOSES OPERATION 219 all, or part of: the collected employee R&D activity data for each employee; the aggregated total cost of employee time devoted to qualified R&D data for the client business; the R&D tax credit qualification rules/requirements data for the client business; the R&D tax credit related operational/financial data for the client business; the calculated R&D tax credit data; data indicating the methods used to calculate the R&D tax credit for the client business, and any other salient R&D related facts data; and/or any other evidentiary data supporting the calculated, and claimed, R&D tax credit, is automatically correlated and securely stored and safeguarded for access by only explicitly authorized parties for use in further analysis, and/or in the event of an audit.

Consequently, in one embodiment, at AUTOMATICALLY CORRELATE AND STORE AT LEAST PART OF THE EMPLOYEE PROVIDED R&D DATA, AND/OR ANY SUPPORTING DATA AND DOCUMENTS USED TO CALCULATE THE R&D COST DATA, AND/OR ANY DATA THAT MAY BE REQUIRED FOR FUTURE TAX AUDITS, OR OTHER PURPOSES OPERATION 219 process for providing an automatic and integrated R&D tax credit program 200 automatically, and securely, stores, and limits access to, the necessary audit source documentation in a self-contained, organized, secure data room where the accounting professional, or other authorized party, can access the necessary documentation for audit purposes.

In one embodiment, once all, or part of: the collected employee R&D activity data for each employee; the aggregated total cost of employee time devoted to qualified R&D data for the client business; the R&D tax credit qualification rules/requirements data for the client business; the R&D tax credit related operational/financial data for the client business; the calculated R&D tax credit data; data indicating the methods used to calculate the R&D tax credit for the client business; any other salient R&D related facts data; and/or any other evidentiary data supporting the calculated, and claimed, R&D tax credit, is automatically correlated and securely stored and safeguarded for use in further analysis and/or in the event of an audit, or for any other future use at AUTOMATICALLY CORRELATE AND STORE AT LEAST PART OF THE EMPLOYEE PROVIDED R&D DATA, AND/OR ANY SUPPORTING DATA AND DOCUMENTS USED TO CALCULATE THE R&D COST DATA, AND/OR ANY DATA THAT MAY BE REQUIRED FOR FUTURE TAX AUDITS, OR OTHER PURPOSES OPERATION 219 process flow proceeds to EXIT OPERATION 231.

In one embodiment, at EXIT OPERATION 231, processes for providing an automatic and integrated R&D tax credit program 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing an automatic and integrated R&D tax credit program 200, accounting professionals can offer their small business clients an efficient, consistent, and resource conserving, process for identifying, documenting, and calculating, R&D tax credits and securely storing the supporting evidentiary data and documents for use in the event of an audit, merger and acquisition, and/or for various other purposes desired and/or required.

In addition, in one embodiment, the activity questions of the R&D project/activity survey tools are specifically crafted to be easily understandable and meaningful to both the survey taker and the IRS to increase the employee survey response rate as well as IRS acceptance rate. In addition, in one embodiment, the R&D project/activity survey tools are customized based on industry and company.

As a result, using process for providing an automatic and integrated R&D tax credit program 200, as discussed herein, accounting professionals can provide their small business clients an efficient and consistent program and process to determine and maximize R&D tax credits they legitimately claim, and a system to apply for the R&D tax credits, without devoting unreasonable resources to the program, and with minimized risk of incorrectly claiming an R&D tax credit. Consequently, process for providing an automatic and integrated R&D tax credit program 200 supports and facilitates the positive goals of R&D tax credits to encourage United States research and development, to ensure the United States remains technologically competitive globally, and to give a business more capital to invest in R&D.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, and/or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing an automatic and integrated R&D tax credit program comprising:
    an accounting professional using the computing system implemented process for providing an automatic and integrated R&D tax credit program to provide one or more Research and Development (R&D) project/activity survey tools to one or more employees of a business that is a client business of the accounting professional;
    using one or more processors to automatically obtain employee R&D activity data from the one or more R&D project/activity survey tools, the employee R&D activity data indicating time the employees of the client business devoted to R&D activities;
    using one or more processors to automatically access a payroll system associated with the client business and automatically obtain employee payroll data for the employees of the client business;
    using one or more processors to automatically transform the employee R&D activity data and the employee payroll data into R&D cost data indicating a cost to the client business of employee time devoted to qualified R&D activity;
    using one or more processors to automatically obtain access to one or more data processing systems used for the business and automatically obtain R&D tax credit qualification data for the client business;
    using one or more processors to automatically transform the R&D cost data and at least part of the R&D tax credit qualification data for the client business into R&D tax credit data for the client business;
    using one or more processors to automatically transfer data representing the R&D tax credit data for the client business to one or more tax preparation systems used for the client business and automatically fill-in relevant data fields of one or more forms associated with the tax preparation system for the client business; and
    using one or more processors to automatically store at least part of the employee R&D activity data, the employee payroll data, the R&D cost data, the R&D tax credit qualification data, and the R&D tax credit data as R&D tax credit evidentiary data for the client business.

2. The computing system implemented process for providing an automatic and integrated R&D tax credit program of claim 1, wherein;
    the one or more R&D project/activity survey tools are provided to the employees of the client business via a database interface application.

3. The computing system implemented process for providing an automatic and integrated R&D tax credit program of claim 1, wherein;
    the one or more R&D project/activity survey tools include reminder messages to be automatically sent to employees of the client business to remind the employees of the client business to access and/or provide their employee R&D activity data.

4. The computing system implemented process for providing an automatic and integrated R&D tax credit program of claim 1, wherein;
    the one or more R&D project/activity survey tools include an employee R&D project/activity survey form.

5. The computing system implemented process for providing an automatic and integrated R&D tax credit program of claim 4, wherein;
    the employee R&D project/activity survey form includes pre-coded survey activities/questions regarding potential R&D activity.

6. The computing system implemented process for providing an automatic and integrated R&D tax credit program of claim 1, wherein;
    the one or more R&D project/activity survey tools include R&D tax credit tutorials.

7. The computing system implemented process for providing an automatic and integrated R&D tax credit program of claim 1, wherein;
    the one or more data processing systems used for the business includes a business financial management system used by the business.

8. The computing system implemented process for providing an automatic and integrated R&D tax credit program of claim 1, wherein;
    the one or more data processing systems used for the business includes a tax preparation system used by the business.

9. The computing system implemented process for providing an automatic and integrated R&D tax credit program of claim 1, wherein;
    the R&D tax credit qualification data for the client business includes R&D tax credit related operational/financial data.

10. The computing system implemented process for providing an automatic and integrated R&D tax credit program of claim 1, wherein;
    the R&D tax credit qualification data for the client business includes R&D tax credit qualification rules/requirements data.

11. A computing system implemented process for providing an automatic and integrated R&D tax credit program comprising:
    creating one or more Research and Development (R&D) project/activity survey tools;
    using one or more processors to provide the one or more R&D project/activity survey tools to one or more employees of a business via a database interface system;

using one or more processors to obtain employee R&D activity data from the employees through the one or more R&D project/activity survey tools, the employee R&D activity data indicating time the employees devoted to R&D activities;

obtaining access to a payroll system for the business;

using one or more processors to obtain employee payroll data for the employees of the business from the payroll system for the business, the employee payroll data including data indicating total hours worked by the employees of the business and compensation paid by the business to the employees of the business;

using one or more processors to automatically transform the employee R&D activity data and the employee payroll data into R&D cost data indicating the compensation paid by the business for time spent by the employees of the business devoted to R&D activities;

obtaining access to a tax preparation system for the business;

using one or more processors to automatically obtain R&D tax credit qualification data for the business from the tax preparation system for the business;

obtaining access to a business financial management system for the business;

using one or more processors to automatically obtain additional R&D tax credit qualification data for the business from the business financial management system for the business;

using one or more processors to transform the R&D cost data for the business and R&D tax credit qualification data for the business into R&D tax credit data for the business, the R&D tax credit data for the business indicating an R&D tax credit the business is eligible to receive;

using one or more processors to automatically transfer the at least part of the R&D tax credit data for the business to a tax preparation system for the business and automatically fill-in relevant data fields of one or more forms of the tax preparation system for the business; and using one or more processors to automatically store at least part of the employee R&D activity data, the employee payroll data, the R&D cost data R&D, the R&D tax credit qualification data, and R&D tax credit data as R&D tax credit evidentiary data for the business.

12. The computing system implemented process for providing an automatic and integrated R&D tax credit program of claim 11, wherein;

the one or more R&D project/activity survey tools are provided to the employees of the business via a database interface application.

13. The computing system implemented process for providing an automatic and integrated R&D tax credit program of claim 11, wherein;

the one or more R&D project/activity survey tools include reminder messages to be automatically sent to employees of the business to remind the employees of the business to access and/or provide their employee R&D activity data.

14. The computing system implemented process for providing an automatic and integrated R&D tax credit program of claim 11, wherein;

the one or more R&D project/activity survey tools include an employee R&D project/activity survey form.

15. The computing system implemented process for providing an automatic and integrated R&D tax credit program of claim 14, wherein;

the employee R&D project/activity survey form includes pre-coded survey activities/questions regarding potential R&D activity.

16. The computing system implemented process for providing an automatic and integrated R&D tax credit program of claim 11, wherein;

the one or more R&D project/activity survey tools include R&D tax credit tutorials.

17. The computing system implemented process for providing an automatic and integrated R&D tax credit program of claim 11, wherein;

the R&D tax credit qualification data for the client business includes R&D tax credit related operational/financial data.

18. The computing system implemented process for providing an automatic and integrated R&D tax credit program of claim 11, wherein;

the R&D tax credit qualification data for the client business includes R&D tax credit qualification rules/requirements data.

19. A system for providing an automatic and integrated R&D tax credit program comprising:

a client tax preparation system used to prepare taxes for a client business that is a client business of an account professional;

a client payroll system used to manage payroll for the client business;

one or more client data management systems used for the client business; and one or more processors associated with one or more computing systems, the one or more processors associated with one or more computing systems implementing at least part of a process for providing an automatic and integrated Research and Development (R&D) tax credit program, the process for providing an automatic and integrated R&D tax credit program including:

the accounting professional using the computing system implemented process for providing an automatic and integrated R&D tax credit program to provide one or more R&D project/activity survey tools to one or more employees of the client business;

using the one or more processors associated with one or more computing systems to automatically obtain employee R&D activity data from the one or more R&D project/activity survey tools, the employee R&D activity data indicating time the employees of the client business devoted to R&D activities;

using the one or more processors associated with one or more computing systems to automatically access the client payroll system and automatically obtain employee payroll data for the employees of the client business;

using the one or more processors associated with one or more computing systems to automatically transform the employee R&D activity data and the employee payroll data into R&D cost data indicating a cost to the client business of employee time devoted to qualified R&D activity;

using the one or more processors associated with one or more computing systems to automatically obtain access to the one or more client data processing systems and automatically obtain R&D tax credit qualification data for the client business;

using one or more processors to automatically transform the R&D cost data and at least part of the R&D tax credit qualification data for the client business into R&D tax credit data for the client business;

using one or more processors to automatically transfer data representing the R&D tax credit data for the client business to the client tax preparation system and automatically fill-in relevant data fields of one or more forms associated with the tax preparation system; and using one or more processors to automatically store at least part of the employee R&D activity data, the employee payroll data, the R&D cost data, the R&D tax credit qualification data, and the R&D tax credit data as R&D tax credit evidentiary data for the client business.

20. The system for providing an automatic and integrated R&D tax credit program of claim 19, wherein;
the one or more R&D project/activity survey tools are provided to the employees of the client business via a database interface application.

21. The system for providing an automatic and integrated R&D tax credit program of claim 19, wherein;
the one or more R&D project/activity survey tools include reminder messages to be automatically sent to employees of the client business to remind the employees of the client business to access and/or provide their employee R&D activity data.

22. The system for providing an automatic and integrated R&D tax credit program of claim 19, wherein;
the one or more R&D project/activity survey tools include an employee R&D project/activity survey form.

23. The system for providing an automatic and integrated R&D tax credit program of claim 22, wherein;
the employee R&D project/activity survey form includes pre-coded survey activities/questions regarding potential R&D activity.

24. The system for providing an automatic and integrated R&D tax credit program of claim 19, wherein;
the one or more R&D project/activity survey tools include R&D tax credit tutorials.

25. The system for providing an automatic and integrated R&D tax credit program of claim 19, wherein;
the one or more data processing systems used for the business includes a business financial management system used by the business.

26. The system for providing an automatic and integrated R&D tax credit program of claim 19, wherein;
the one or more data processing systems used for the business includes a tax preparation system used by the business.

27. The system for providing an automatic and integrated R&D tax credit program of claim 19, wherein;
the R&D tax credit qualification data for the client business includes R&D tax credit related operational/financial data.

28. The system for providing an automatic and integrated R&D tax credit program of claim 19, wherein;
the R&D tax credit qualification data for the client business includes R&D tax credit qualification rules/requirements data.

29. A system for providing an automatic and integrated R&D tax credit program comprising:
a business financial management system used for a business;
a tax preparation system used to prepare taxes for the business;
a payroll system used to manage payroll for the business; and
one or more processors associated with one or more computing systems, the one or more processors associated with one or more computing systems implementing at least part of a process for providing an automatic and integrated Research and Development (R&D) tax credit program, the process for providing an automatic and integrated R&D tax credit program including:
creating one or more R&D project/activity survey tools;
using the one or more processors associated with one or more computing systems to provide the one or more R&D project/activity survey tools to one or more employees of a business via a database interface system;
using the one or more processors associated with one or more computing systems to obtain employee R&D activity data from the employees through the one or more R&D project/activity survey tools, the employee R&D activity data indicating time the employees devoted to R&D activities;
obtaining access to the payroll system;
using the one or more processors associated with one or more computing systems to obtain employee payroll data for the employees of the business from the payroll system, the employee payroll data including data indicating total hours worked by the employees of the business and compensation paid by the business to the employees of the business;
using the one or more processors associated with one or more computing systems to automatically transform the employee R&D activity data and the employee payroll data into R&D cost data indicating the compensation paid by the business for time spent by the employees of the business devoted to R&D activities;
obtaining access to the tax preparation system;
using the one or more processors associated with one or more computing systems to automatically obtain R&D tax credit qualification data for the business from the tax preparation system;
obtaining access to the business financial management system;
using the one or more processors associated with one or more computing systems to automatically obtain additional R&D tax credit qualification data for the business from the business financial management system;
using the one or more processors associated with one or more computing systems to transform the R&D cost data for the business and R&D tax credit qualification data for the business into R&D tax credit data for the business, the R&D tax credit data for the business indicating an R&D tax credit the business is eligible to receive;
using the one or more processors associated with one or more computing systems to automatically transfer the at least part of the R&D tax credit data for the business to the tax preparation system and automatically fill-in relevant data fields of one or more forms of the tax preparation system for the business; and
using the one or more processors associated with one or more computing systems to automatically store at least part of the employee R&D activity data, the employee payroll data, the R&D cost data R&D, the R&D tax credit qualification data, and R&D tax credit data as R&D tax credit evidentiary data for the business.

30. The system for providing an automatic and integrated R&D tax credit program of claim 29, wherein;
the one or more R&D project/activity survey tools are provided to the employees of the business via a database interface application.

31. The system for providing an automatic and integrated R&D tax credit program of claim 29, wherein;
the one or more R&D project/activity survey tools include reminder messages to be automatically sent to employees of the business to remind the employees of the business to access and/or provide their employee R&D activity data.

32. The system for providing an automatic and integrated R&D tax credit program of claim 29, wherein;
the one or more R&D project/activity survey tools include an employee R&D project/activity survey form.

33. The system for providing an automatic and integrated R&D tax credit program of claim 32, wherein;
the employee R&D project/activity survey form includes pre-coded survey activities/questions regarding potential R&D activity.

34. The system for providing an automatic and integrated R&D tax credit program of claim 29, wherein;
the one or more R&D project/activity survey tools include R&D tax credit tutorials.

35. The system for providing an automatic and integrated R&D tax credit program of claim 29, wherein;
the R&D tax credit qualification data for the client business includes R&D tax credit related operational/financial data.

36. The system for providing an automatic and integrated R&D tax credit program of claim 29, wherein;
the R&D tax credit qualification data for the client business includes R&D tax credit qualification rules/requirements data.

* * * * *